(12) United States Patent
Rard et al.

(10) Patent No.: US 7,004,100 B1
(45) Date of Patent: Feb. 28, 2006

(54) CANOE GUNWALE

(76) Inventors: Roy Rard, 20461 Comet La., Mt. Vernon, WA (US) 98274-8018; Chris Nelson, 20461 Comet La., Mt. Vernon, WA (US) 98274-8018; Robert McDonough, 2602 Walker Ave., Greensboro, NC (US) 27403; Robert Peerson, 3940 Cloverwood Meadow La., High Point, NC (US) 27265; Scott Griffith, 4611 Riverwiew Dr., Trinity, NC (US) 27370; William Smith, 3024 Old Mountain Rd., Trinity, NC (US) 27370; Robert Grubb, 510 Commerce St., Loudon, TN (US) 37774

( * ) Notice: Subject to any disclaimer, the term of this patent is extended or adjusted under 35 U.S.C. 154(b) by 0 days.

(21) Appl. No.: 10/213,425

(22) Filed: Aug. 6, 2002

(51) Int. Cl.
*B63B 35/71* (2006.01)

(52) U.S. Cl. .................................. 114/347; 114/364
(58) Field of Classification Search ............... 114/343, 114/347, 351, 356, 361, 363, 364; D12/317
See application file for complete search history.

(56) References Cited

U.S. PATENT DOCUMENTS

| | | | | |
|---|---|---|---|---|
| 1,257,073 | A | * | 2/1918 | Frank ........................ 114/364 |
| 1,749,711 | A | * | 3/1930 | Meyer ........................ 441/40 |
| 2,671,231 | A | | 3/1954 | Massicotte |
| 3,233,257 | A | | 2/1966 | Biehl |
| 3,367,349 | A | | 2/1968 | O'Link |
| 4,085,473 | A | | 4/1978 | Franklin |
| 4,380,208 | A | * | 4/1983 | Goserud ..................... 114/363 |
| 4,569,301 | A | * | 2/1986 | Pyburn ..................... 114/61.23 |
| 4,624,209 | A | * | 11/1986 | Loffler ........................ 114/354 |
| 4,660,497 | A | * | 4/1987 | Cochran ..................... 114/345 |
| D290,950 | S | * | 7/1987 | Strickland .................. D12/317 |
| 4,724,791 | A | * | 2/1988 | McSorley .................... 114/343 |
| 4,724,792 | A | * | 2/1988 | Cochran ..................... 114/345 |
| 4,768,459 | A | * | 9/1988 | Cerkvenik et al. .......... 114/363 |
| 4,898,111 | A | * | 2/1990 | Hackney .................. 114/61.23 |
| 4,903,629 | A | | 2/1990 | Maudlin et al. |
| 4,966,092 | A | | 10/1990 | Illingworth |
| 5,050,526 | A | * | 9/1991 | Nelson et al. ............... 114/364 |
| D324,146 | S | * | 2/1992 | Crowe ........................ D6/500 |
| 5,168,825 | A | * | 12/1992 | Ring .......................... 114/363 |
| 5,331,915 | A | | 7/1994 | Snyder |
| 5,343,824 | A | | 9/1994 | Floyd |
| 5,501,169 | A | | 3/1996 | Denker |
| 5,540,176 | A | * | 7/1996 | Galea ......................... 114/361 |
| 5,730,077 | A | * | 3/1998 | Nunes et al. ................ 114/219 |
| 5,988,094 | A | * | 11/1999 | Obrinski ................ 114/230.26 |
| 6,089,179 | A | * | 7/2000 | Pestel et al. ................. 114/345 |
| 6,105,305 | A | * | 8/2000 | Edens ......................... 43/54.1 |
| 6,435,126 | B1 | * | 8/2002 | Burke ......................... 114/363 |

OTHER PUBLICATIONS

"A Quick Photo Tour of Canoe Construction"; information from the internet; copyright 1998.

(Continued)

*Primary Examiner*—Andrew D. Wright
(74) *Attorney, Agent, or Firm*—Dean A. Craine

(57) ABSTRACT

An improved canoe including a hull has sidewalls extending fore and aft and a gunwale on the sidewalls. The gunwale has longitudinal slot extending for a substantial portion of the entire hull. A canoe accessory has a thickened attachment portion for engagement in the slot to attach the accessory to the canoe. A method of canoeing includes inserting a thickened portion of a canoeing accessory into a slot at a canoe gunwale to retain the accessory in place and paddling the canoe on a body of water.

7 Claims, 36 Drawing Sheets

OTHER PUBLICATIONS

Diagram-The Hawaiian Canoe; information from the internet; undated.

The Newfound Woodworks, Inc., information from the internet; undated.

* cited by examiner

BOLTROPE SLOT

**GUNWALE INSERT
TO COVER FASTENERS**

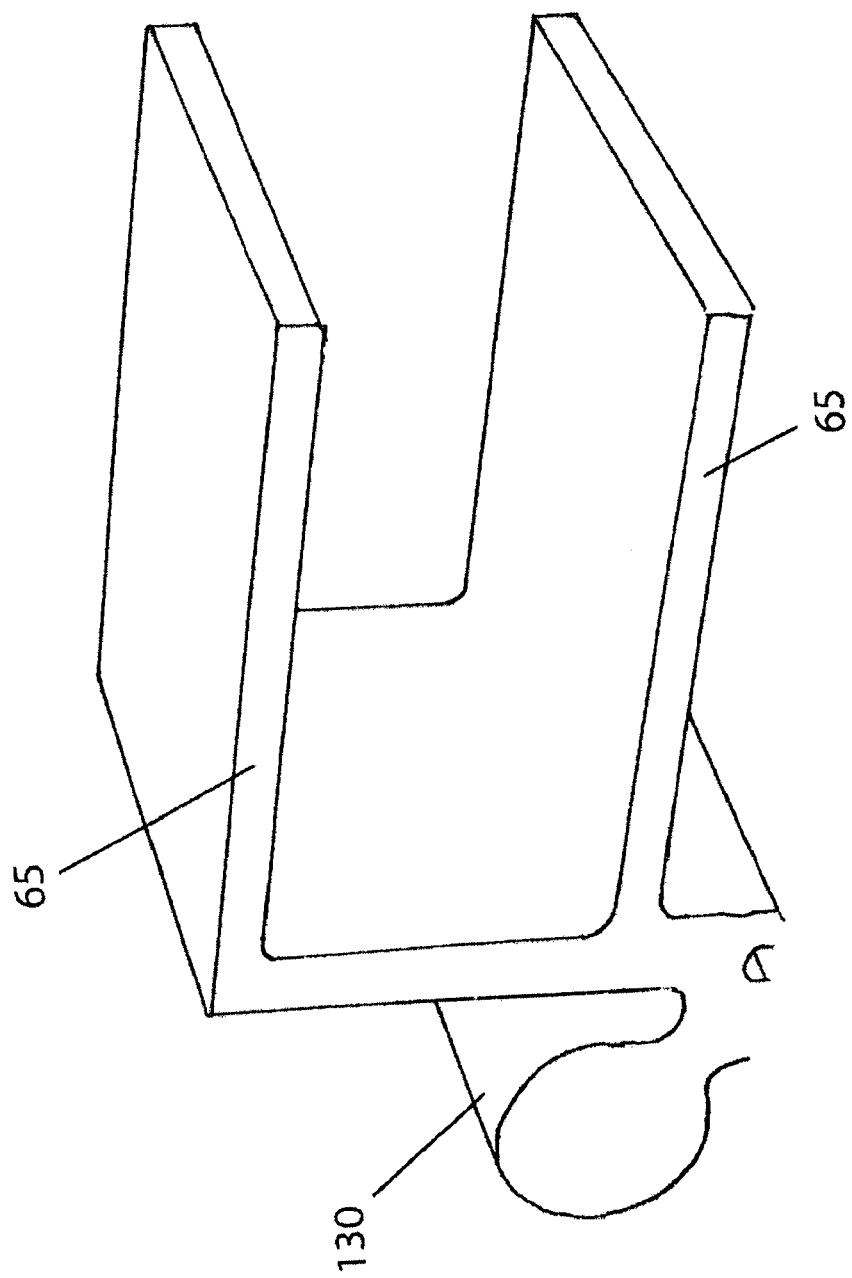

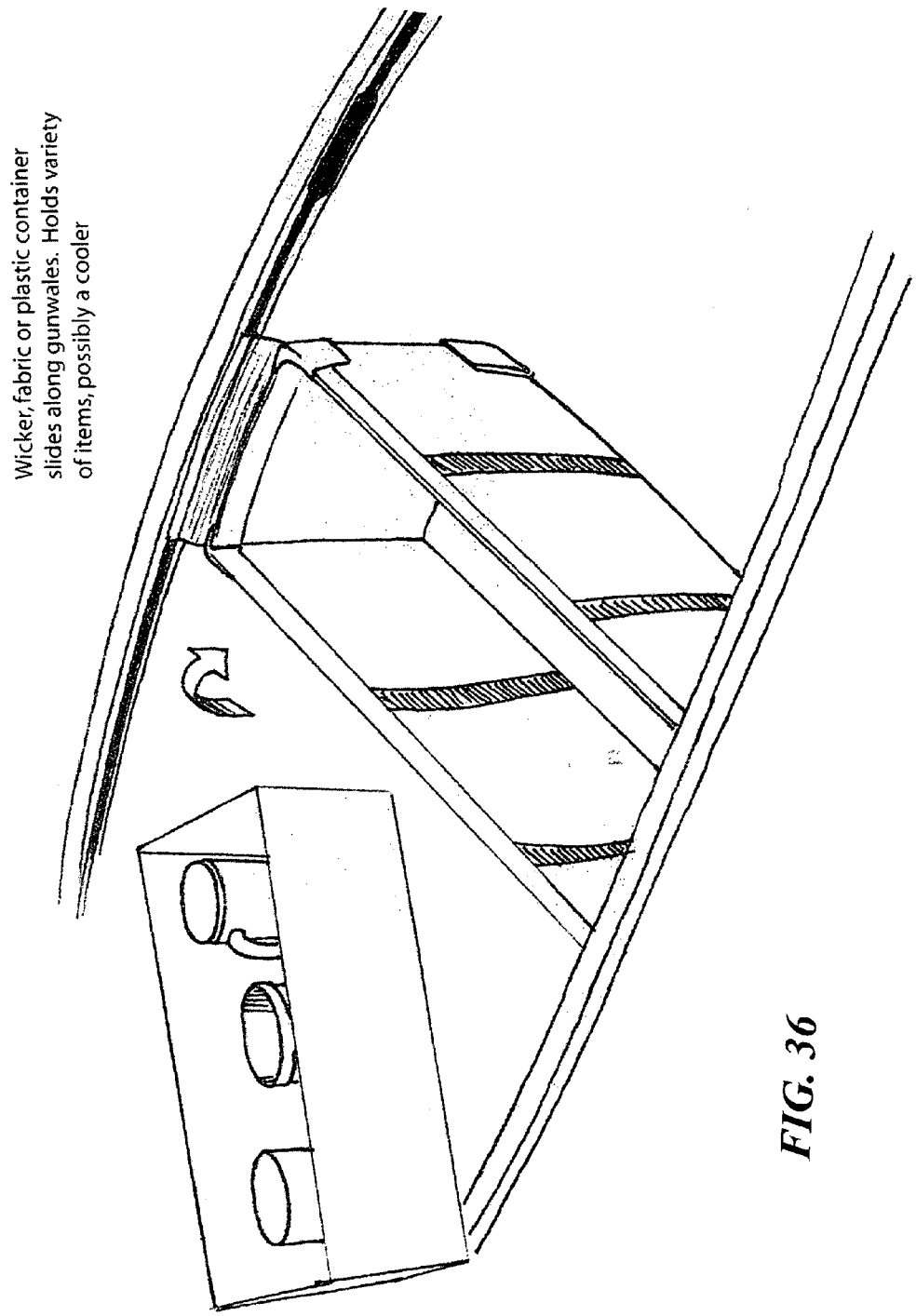

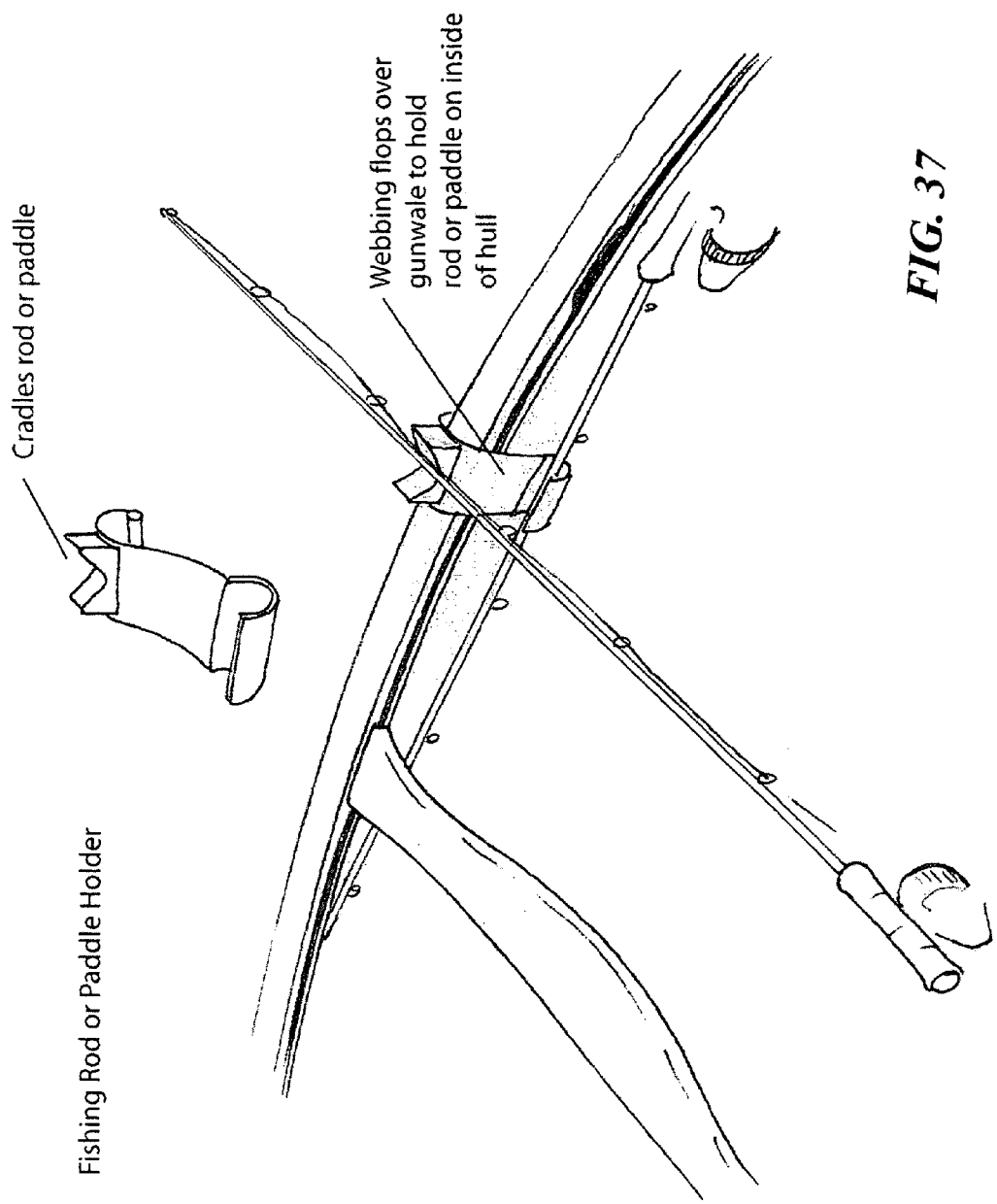

CANOE GUNWALE

BACKGROUND OF THE INVENTION

The present invention relates to canoes having gunwales useful for attaching canoeing accessories thereto.

Canoes have been used for thousands of years. Early canoes were constructed by assembling frames of wooden ribs and sewing layers of birch, elm or cedar bark together using spruce or pine root. The sewn layers of bark were attached to the wooden rib frame to form a lightweight, water resistant outer shell of the canoe. Such canoes were used for exploring, traveling, and transporting heavy objects such as furs in commerce. The upper edge of such a canoe's sides is called the gunwale, which extends fore and aft of the canoe along its length.

Today's canoes are similar to the canoes of yore but may be constructed from fiberglass and other materials and are popular for a variety of recreational activities. Modern-day canoeists use the versatile watercraft for activities including bird watching, whitewater paddling, snorkeling, and fishing, among other activities. When a single canoe is used for a variety of recreational activities, accessories are often desired for optimal enjoyment of each particular activity. Accessories for increased enjoyment of such recreational activities are available in the marketplace but no satisfactory system of adapting all of the accessories interchangeably or in combination to a single canoe exists.

Therefore there is a need for a canoe that can be adapted to a wide range of activities, and that offers the canoeist an ability to interchangeably or in combination carry and use various accessories. There is also a need for an improved method of canoeing whereby a canoeist can carry any of a wide range of accessories with her that are interchangeably or in combination easily adaptable to the canoe, and that are secured to the canoe.

SUMMARY OF THE INVENTION

The present invention fulfills this need in the art by providing a canoe with gunwales that provide a slot for securing a boltrope. Because the boltrope is attachable to many canoeing accessories, a variety of activities are enjoyable using the canoe.

The invention includes a watercraft comprising a hull extending fore and aft and including sidewalls having an upwardly extending edges, the sidewalls having insides and outsides, and a gunwale on a sidewall including a boltrope slot having a portion to receive a boltropes and an adjacent portion to retain a received boltrope.

The gunwale slots may include substantially circular cross sections for holding articles that incorporate boltropes or boltrope-shaped lugs and a seat assembly having a boltrope so the seat is slidably positionable fore and aft in the watercraft and securable into the slot in the gunwale. The watercraft may further include a bracket having a bolt and nut, the bracket fitting into the slot. The bolt may include a flanged head that fits into the slot in the canoe gunwales and the nut may be exposed to facilitate hand tightening of the nut for selectively securing the bracket along the gunwale. The watercraft may further include a thwart having a boltrope slot and be attached to the gunwale and extending transversely of the watercraft. The slot on the thwart may include a substantially circular cross section for holding articles that incorporate boltropes or boltrope-shaped lugs. The thwart may be attached to opposing gunwales with a bracket having a boltrope-shaped lug.

The boltrope slot may include a plurality of discrete attachment passageways formed at spaced intervals in the slot. The gunwale may further include a channel for attaching the gunwale to the upwardly extending edge of the sidewalls. The boltrope slot may be adjacent the inside of the sidewall. The gunwale may further include a second boltrope slot which may be adjacent the outside of the sidewalls.

The gunwale is preferably arcuate along its length to approximate the arc of a watercraft sidewall and the gunwale may further include a bumper trim piece adjacent the outside of the sidewalls. The gunwale may be extruded aluminum, wood, molded plastics or other materials. The gunwale with boltrope slot may extend substantially the length of the watercraft.

The present invention also includes a watercraft comprising a hull extending fore and aft and including sidewalls having an upwardly extending edges, the sidewalls having insides and outsides, and a gunwale having an outwardly protruding portion extending fore and aft near an upwardly extending edge of a sidewall for attaching accessories to the watercraft and a means for attaching the gunwale to an upwardly extending edge of a sidewall.

The outwardly protruding portion may have a constant cross section for receiving and holding accessories that have a cavity for attaching to the outwardly protruding portion of the gunwale. The constant cross section can be substantially circular, triangular, T-shaped or include various other shapes. The gunwale may be arcuate along its length to approximate the arc of a watercraft sidewall. The outwardly protruding portion may extend for a substantial portion of the gunwale length.

The gunwale may further include a channel for attaching the gunwale to the upwardly extending edge of the sidewalls and can be extruded aluminum, wood, molded plastics, or various other materials.

The present invention also includes a gunwale for a watercraft having a hull including sidewalls having insides and outsides and upwardly extending edges comprising a fixture having a boltrope slot and a means for attaching the fixture to the upwardly extending edges of the sidewalls.

The boltrope slot may include a substantially circular cross section for holding articles that incorporate boltropes or boltrope-shaped lugs and the fixture is extruded aluminum and may include a plurality of discrete attachment passageways formed at spaced intervals in the boltrope slot, a channel for attaching the fixture to the upwardly extending edges of the sidewalls, and a bumper trim piece adjacent the outside of the watercraft sidewalls.

The fixture may be arcuate along its length to approximate the arc of a watercraft sidewall. The boltrope slot may extend for a substantial portion of the fixture length and the gunwale may include a second boltrope slot which may be adjacent the outsides of the sidewalls.

The present invention includes a gunwale for a watercraft having a hull including sidewalls having insides and outsides and upwardly extending edges comprising an outwardly protruding portion extending fore and aft for attachment near an upwardly extending edge of a hull sidewall for attaching accessories to the watercraft and a means for attaching the gunwale to a sidewall.

The outwardly protruding portion of the gunwale may have a constant cross section for receiving and holding accessories with a cavity for attaching to the outwardly protruding portion of the gunwale and the constant cross section may be substantially circular, triangular, T-shaped or otherwise configured.

The gunwale may be arcuate along its length to approximate the arc of a watercraft sidewall and may further includes a channel for attaching the gunwale to the upwardly extending edge of the sidewalls. The gunwale may be extruded aluminum, wood, molded plastic or other materials.

The present invention also includes a rail attachable to a watercraft having a hull including sidewalls having insides and outsides and upwardly extending edges, the rail for attaching accessories to the watercraft comprising an outwardly protruding portion extending fore and aft near an upwardly extending edge of a sidewall and a means for attaching the rail to the to an upwardly extending edge of a sidewall. The outwardly protruding portion may have a constant cross section for receiving and holding accessories with a cavity for attaching to the outwardly protruding portion of the gunwale. The constant cross section may be substantially circular, triangular, T-shaped, or various other shapes. The rail may be arcuate along its length to approximate the arc of a watercraft sidewall.

An improved watercraft comprising a hull extending fore and aft and including sidewalls having an upwardly extending edge, the sidewalls having insides and outsides, a gunwale on a sidewall including a boltrope slot having portions to receive a boltrope and adjacent portions to retain a received boltrope, and an accessory having a thickened attachment portion for engagement in the slot to attach the accessory to the watercraft. The accessory may be a multiuse workstation, a seat, a thwart, a whitewater skirt, a canoe cover, a dry sack, a belly cover, a pontoon-catamaran link up, a D-ring, a binocular bag, a dry bag, a sponson, a miniskirt, an extended deck, a foot brace rail, a baby tent, a shelter, a lashing system, a hip pocket module, a cooler, a fishing rod holder, a hunting blind, a paddle holder, or various other attachments.

The present invention also includes an improved watercraft accessory for use with a watercraft having a boltrope slot comprising a functional portion and an attachment portion adapted for engagement in the boltrope slot to attach the accessory to the watercraft. The accessory may be a multiuse workstation, a seat, a thwart, a whitewater skirt, a canoe cover, a dry sack, a belly cover, a pontoon-catamaran link up, a D-ring, a binocular bag, a dry bag, a sponson, a miniskirt, an extended deck, a foot brace rail, a baby tent, a shelter, a lashing system, a hip pocket module, a cooler, a fishing rod holder, a hunting blind, a paddle holder, or various other attachments. The attachment portion of the accessory may include a protruding tab having an elongate thickened portion at a distal end, the thickened portion having a thickness great enough to be secure in the boltrope slot and thin enough to be inserted in a widened portion of the boltrope slot.

The present invention also includes a method of canoeing including inserting a thickened portion of a canoeing accessory into a slot at a canoe gunwale to retain the accessory in place, and paddling the canoe on a body of water. The accessory may be a multiuse workstation, a seat, a thwart, a whitewater skirt, a Conestoga cover, a canoe cover, a dry sack, a belly cover, a pontoon-catamaran link up, a D-ring, a binocular bag, a dry bag, a sponson, a tech rail, a canoe miniskirt, an extended deck, a tandem foot brace rail, a baby tent, a shelter, a lashing system, a hip pocket module, a cooler, a fishing rod holder, or a paddle holder.

BRIEF DESCRIPTION OF THE DRAWINGS

FIG. 16 is a perspective view of a bracket for securing a thwart to a watercraft.

FIG. 36 is a perspective view of a suspended storage compartment for a watercraft.

FIG. 37 is a perspective view of a paddle or rod holder for a watercraft.

DETAILED DESCRIPTION OF EXAMPLES OF THE INVENTION

Figure 1:
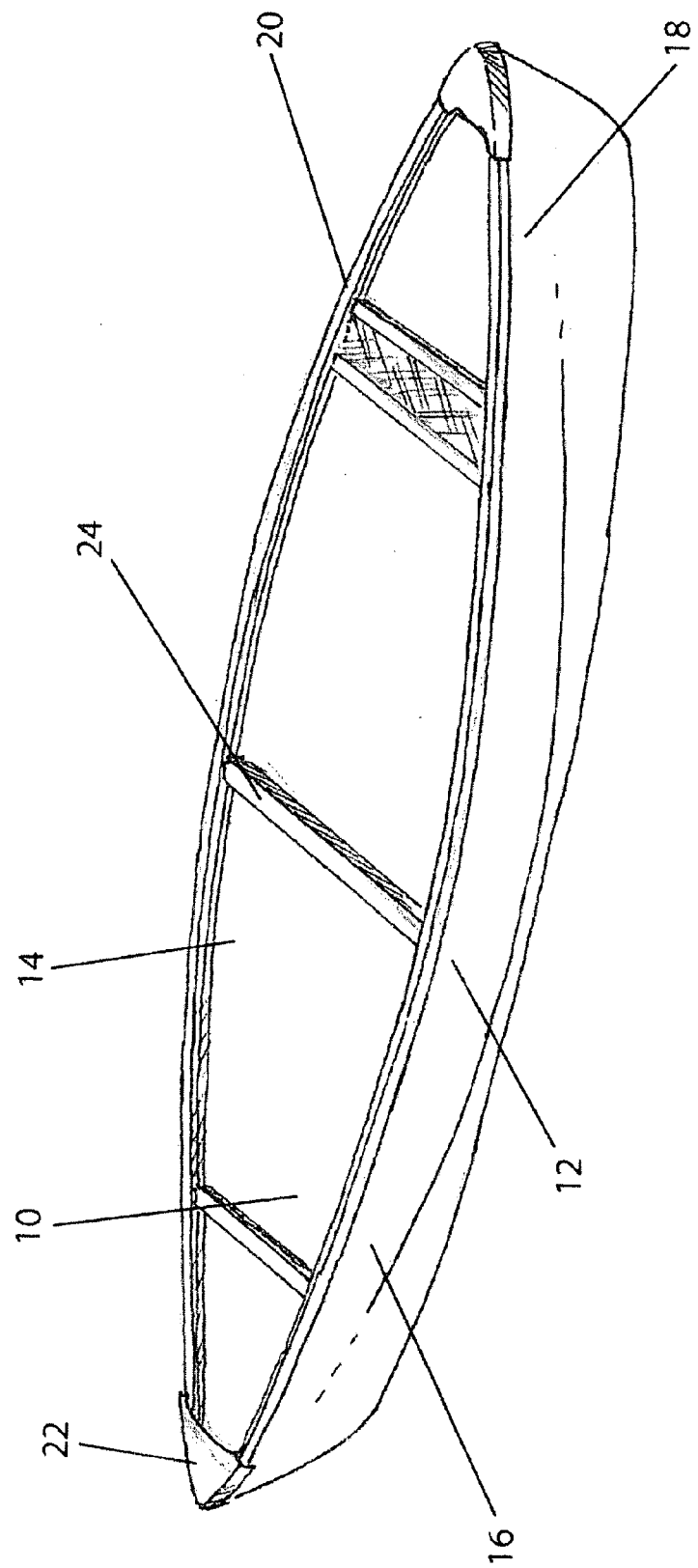
FIG. 1 is a perspective view of a canoe including a sidewalls extending fore and aft and a gunwale for securing accessories to a watercraft.

FIG. 1 is a perspective view of a canoe. The canoe has a hull 10 including sidewalls 12 extending fore and aft. The sidewalls 12 have insides 14 and outsides 16 and an upwardly extending edge 18. Attached to each sidewall 12, atop its upwardly extending edge 18, is a gunwale 20. At the fore and aft end of the gunwales 20 is an end cap 22 which terminates the gunwales. The preferred embodiment further includes a thwart 24 secured to the gunwales 20 and extending transversly to the gunwales across the canoe to stiffen and strengthen the hull 10 and form the hull 10 to a desired width.

Figure 2:
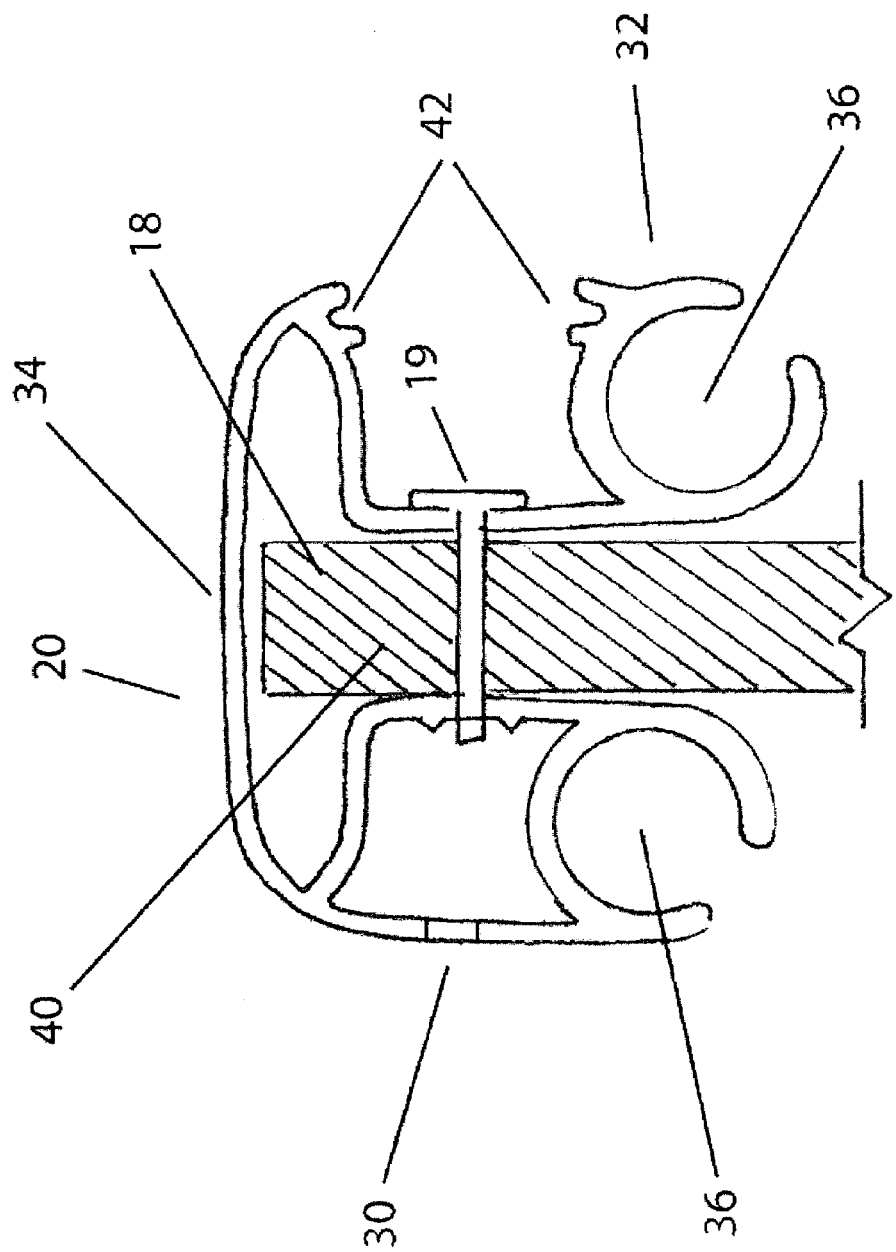
FIG. 2 is an end view of an improved gunwale with slots for securing accessories and outfitting to a watercraft.

FIG. 2 is an end view of an improved canoe gunwale for securing accessories to a conoe. In the preferred embodiment, the gunwale is extruding aluminum and further includes an inside 20 and an outside 32 and a hand rest portion at the top of the gunwale 30. The inside of the gunwale 30 further includes a slot 36 running along the length of the gunwale with a cross-section for receiving and holding boltropes or boltropes-shaped lugs. The slot 36 is substantially circular cavity for holding articles that incorporates boltropes and boltrope-shaped lugs. It can, however, have a cross-section that is triangular, T-shaped, or otherwise not circular and perform quite satisfactorily. The hand rest portion of the gunwale 30 rests atop the canoe sidewall 12. A bolt secures the gunwale to the upward extending edge 18 and can be driven in from the outside 32. Directly under the hand rest portion of the gunwale 30 is a channel 40 into which the upwardly extending edge 18 of the canoe fits.

The gunwale also includes two bumper grooves 42 on its outside 32 for receiving and holding a strip of flexible material that serves as a bumper trim piece for protecting the canoe sidewalls and covering the bolts 19. Several bolts are used, but only one is shown in FIG. 2. Screws, rivets, or other attachment devices that may be used to pass through the sidewalls of the channel 40 to hold the gunwale on top of the sidewall 18. Below the bumper grooves 42, also on the gunwale outside 32, is a second boltrope slot 36, which is also a substantially circular cavity for holding articles that incorporate boltropes and boltrope-shaped lugs. The second boltrope slot can also have a triangular, T-shaped, or other cross section and perform satisfactorily. While the preferred embodiment includes boltrope slots on the inside 30 and outside 32 of the gunwale, the present invention can also be constructed by including T-shaped, rectangular, or other shapes of cavities instead of substantially circular cavities for holding articles that incorporate a boltrope or other adaptation. In addition, the male/female relationship of the cavities and boltrope or lugs can be reversed. Further, only one boltrope slot may be used, and the location of the slot can be varied.

Figure 3:
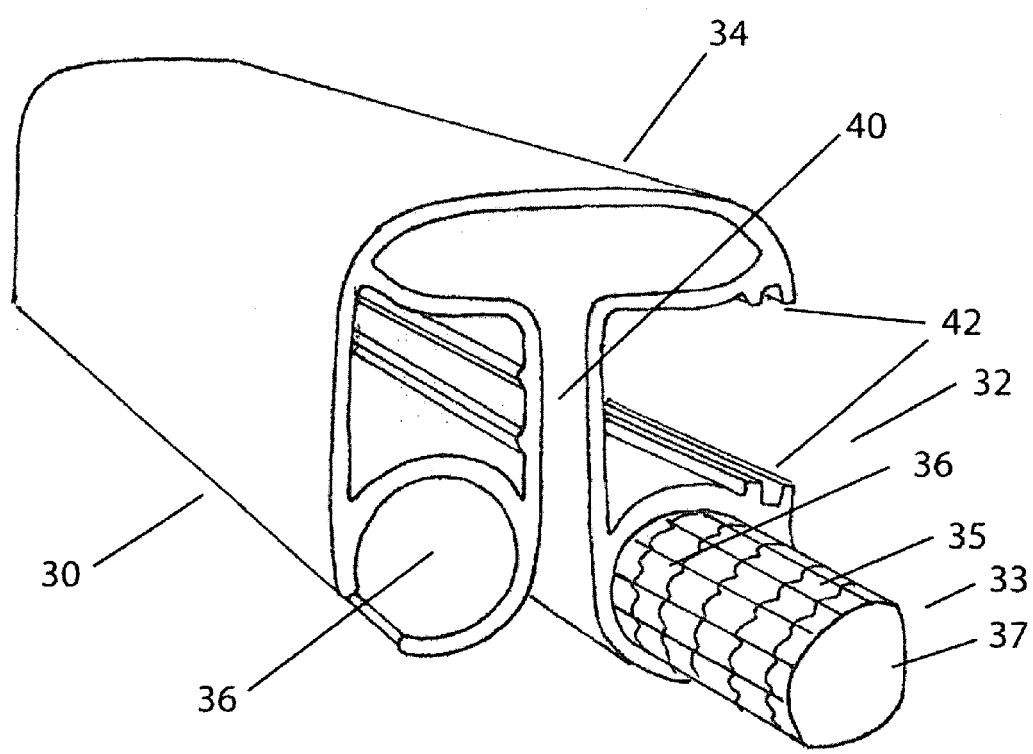
FIG. 3 is a perspective view of an improved gunwale for a watercraft with slots and a boltrope.

FIG. 3 is a perspective view of the gunwale showing the boltrope slots 36 on the inside 30 and outside 32 of gunwale, the bumper grooves 42, the channel 40 for holding the gunwale on top of the sidewall 40, and the hand rest portion at the top of the gunwale 34. As seen in FIG. 3, a boltrope 33 is shown (partially broken away) as a fabric 35 wrapped around and sewn to a cord or rope 37. Such constructions are known in the sailboat art, as edges for sails. In this embodiment the fabric 35 has one of its wrapped sides extend into and connect with the accessory used with the canoe, of which several examples will be described.

Figure 4:
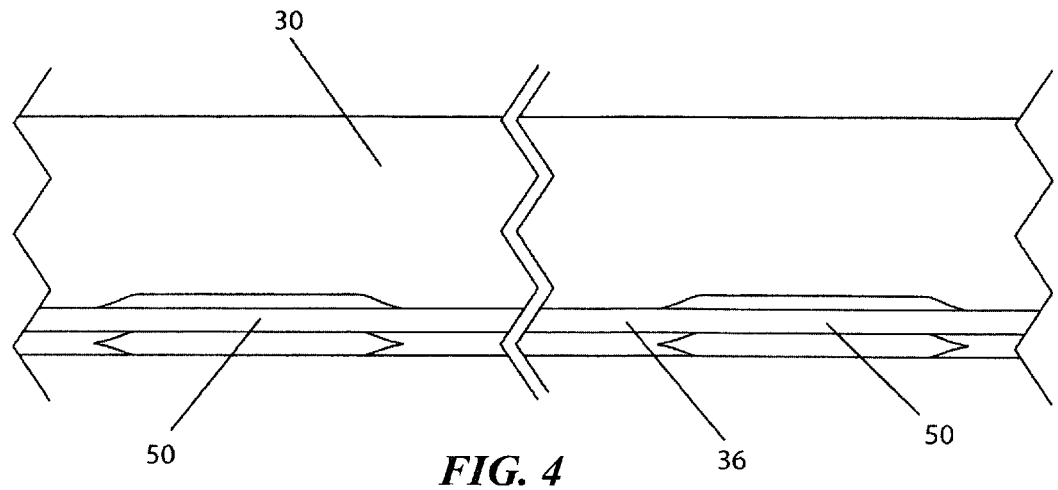
FIG. 4 is a side view of the inside of an improved gunwale for a watercraft.
Figure 5:
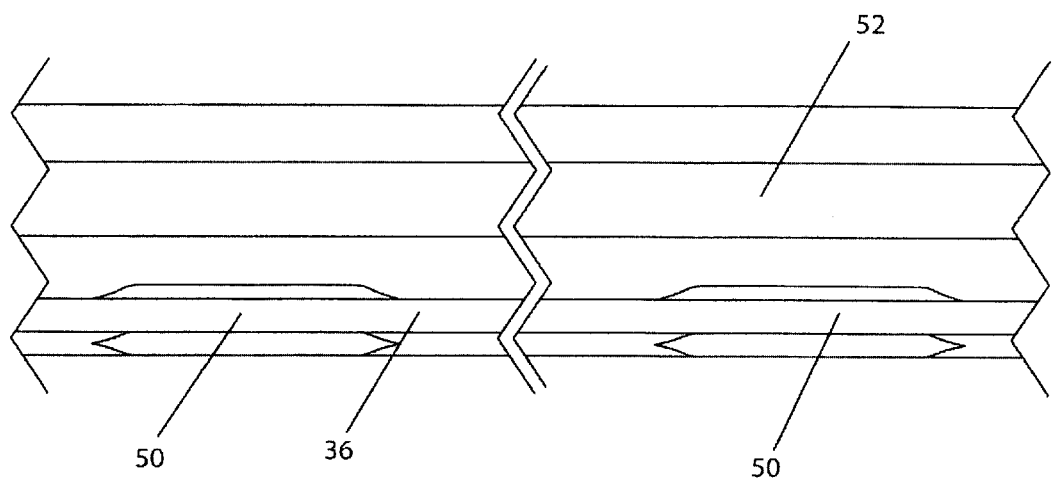
FIG. 5 is a side view of the outside of an improved gunwale for a watercraft.

FIG. 4 is a view of the inside face of the gunwale 30 showing the boltrope slot 36 including a plurality of discrete attachment passageways 50 formed at spaced intervals in the slot 36. The passageways 50 are widened openings that allow the boltropes to be inserted and slid positioned along the slot 36 so that they cannot be pulled out laterally. The dimensions of the slot 36, however, do not change, but rather the passageways 50, or widened openings, are included to allow accessories to be inserted into the slots 36. FIG. 5 is the outside face of the gunwale 32 including a boltrope slot 36 including a plurality of discrete attachment passageways 50 formed at spaced intervals in the slot 36. Above the boltrope slot is a bumper trim piece 52 for protecting the canoe sidewalls and covering bolt heads, as described above.

Figure 6:
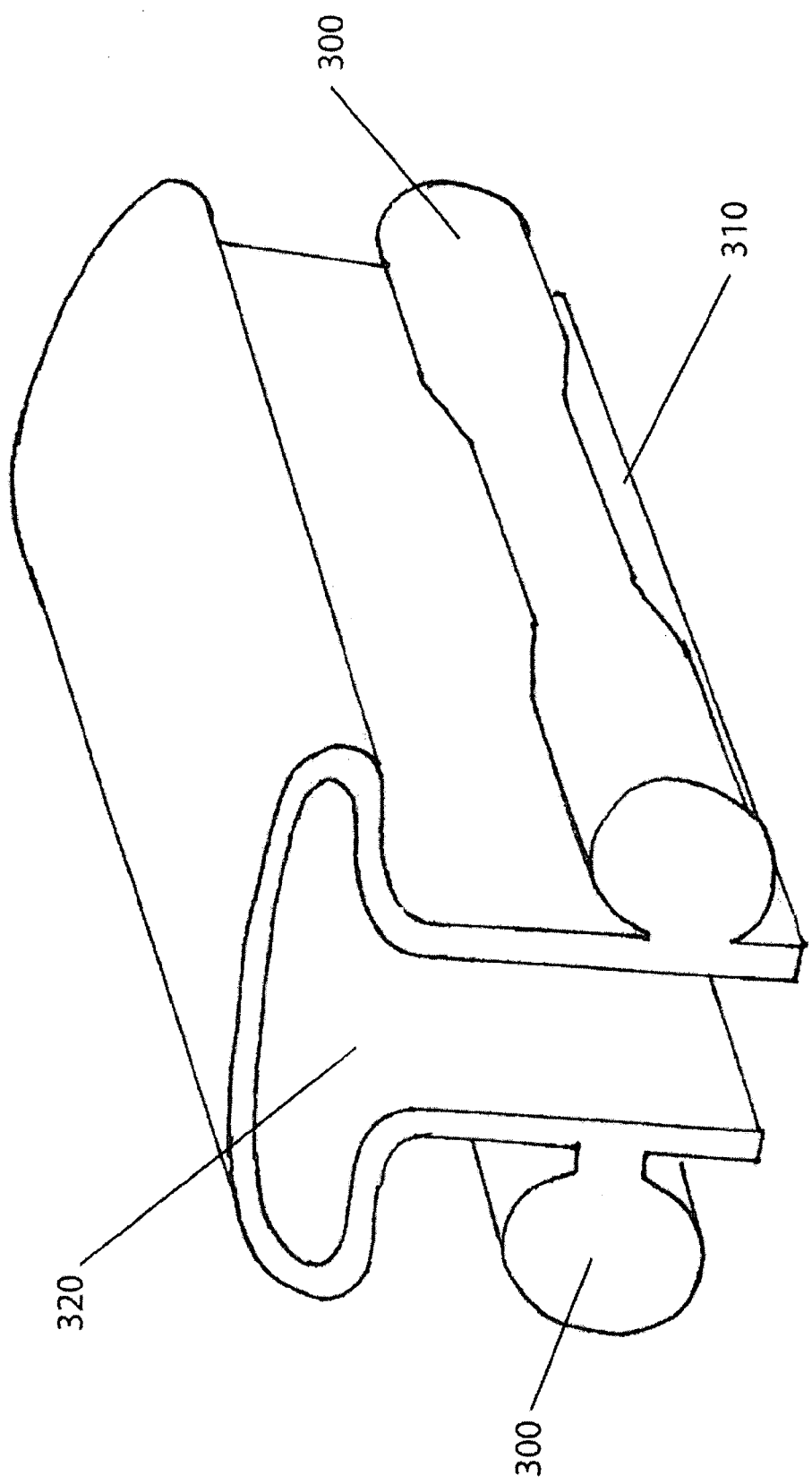
FIG. 6 is a perspective view of an improved gunwale for a watercraft having an outwardly protruding portion having indentations for securing accessories to the canoe.

FIG. 6 is a perspective view of an alternative embodiment of the gunwale wherein the boltrope slots have been replaced by outwardly protruding portions 300 for attaching accessories to a watercraft. The accessories can include a C-shaped claw for holding the accessories to the outwardly protruding portion 300 of the gunwale. The outwardly protruding portion 300 may further include indentions 310 where the C-shaped claw of the accessory can be inserted onto the outwardly protruding portion 300 of the gunwale. The outwardly protruding portion 300 of the gunwale can extend for a substantial portion of the gunwale length or may extend only for a few inches or feet.

Figure 7:
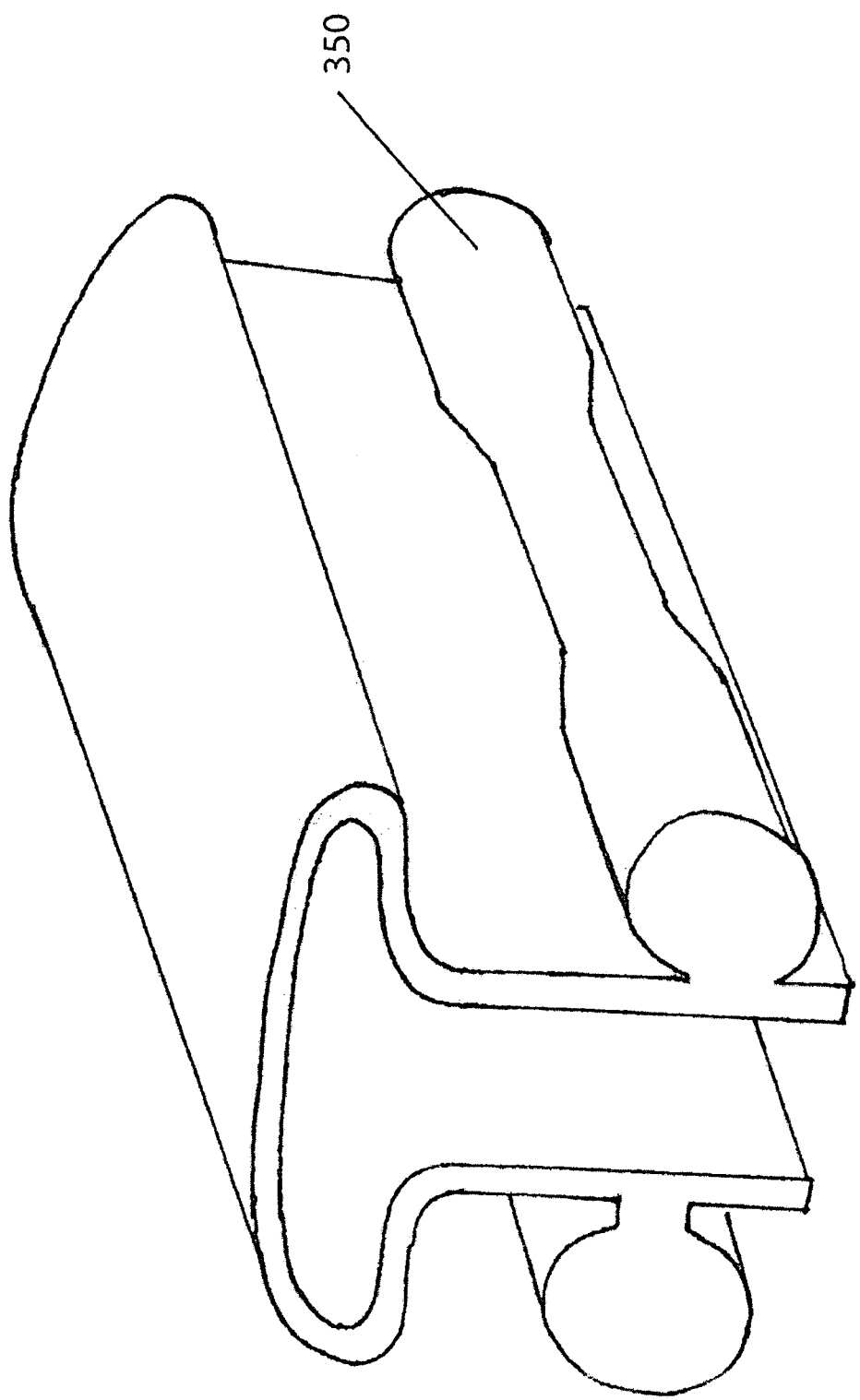
FIG. 7 is a perspective view of an improved gunwale for a watercraft having an outwardly protruding portion.
Figure 8:
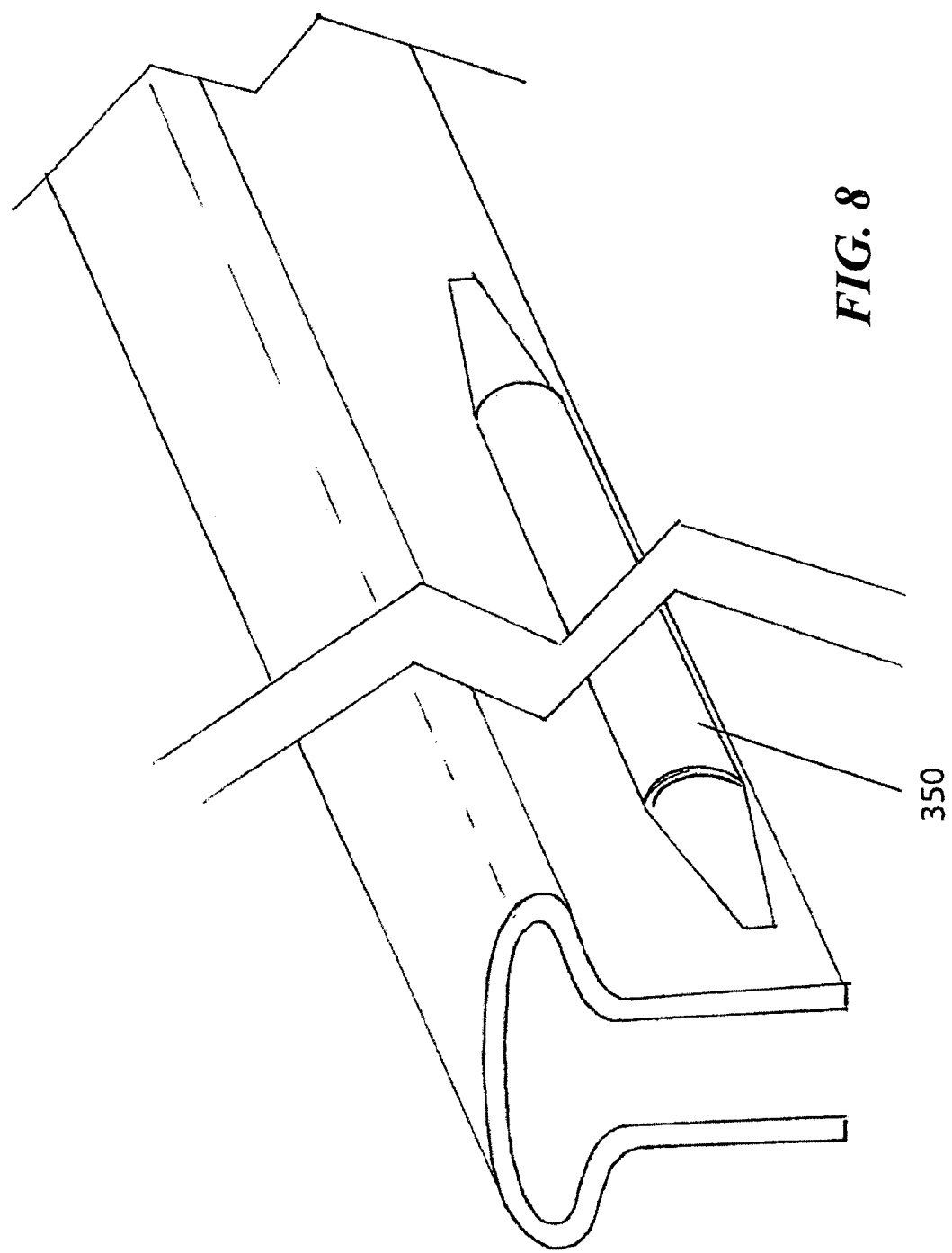
FIG. 8 is a perspective view of an improved gunwale for a watercraft that does not extend the entire length of the canoe hull.

FIG. 7 is another alternative embodiment of the gunwale wherein the outwardly protruding portion 350 of the gunwale has a constant cross section that is substantially circular. However, breaks in the outwardly protruding portion 350 allow a claw to be fitted over the thus-exposed end of the portion 350. The outwardly protruding portion 350, however, can also be T-shaped, triangular, egg-shaped, or have other cross-sections. The outwardly protruding portion 350 can extend for a substantial portion of the gunwale length or can extend only a few inches or feet, as shown in FIG. 8, and can be extruded aluminum, wood or other suitable material.

Figure 8A:
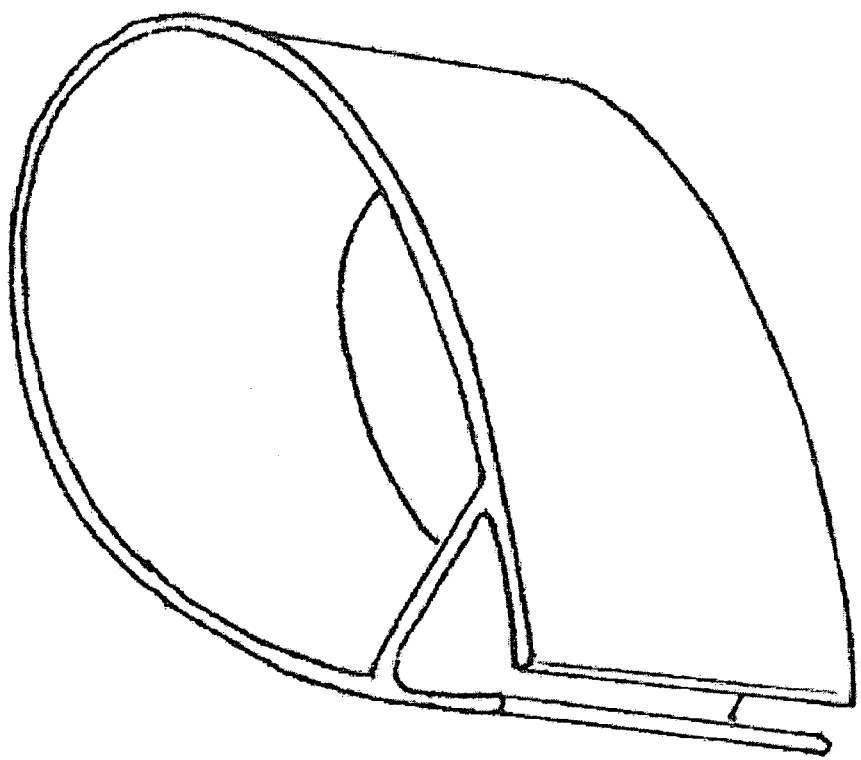
FIG. 8A is a perspective view of a cross section of an alternatively shaped boltrope slot.

FIG. 8A is a perspective view of a cross section of an alternatively shaped boltrope slot wherein the boltrope slot is triangular shaped. The slot can be also be T-shaped, egg-shaped, square, or have various other cross section shapes and perform satisfactorily.

Figure 9:
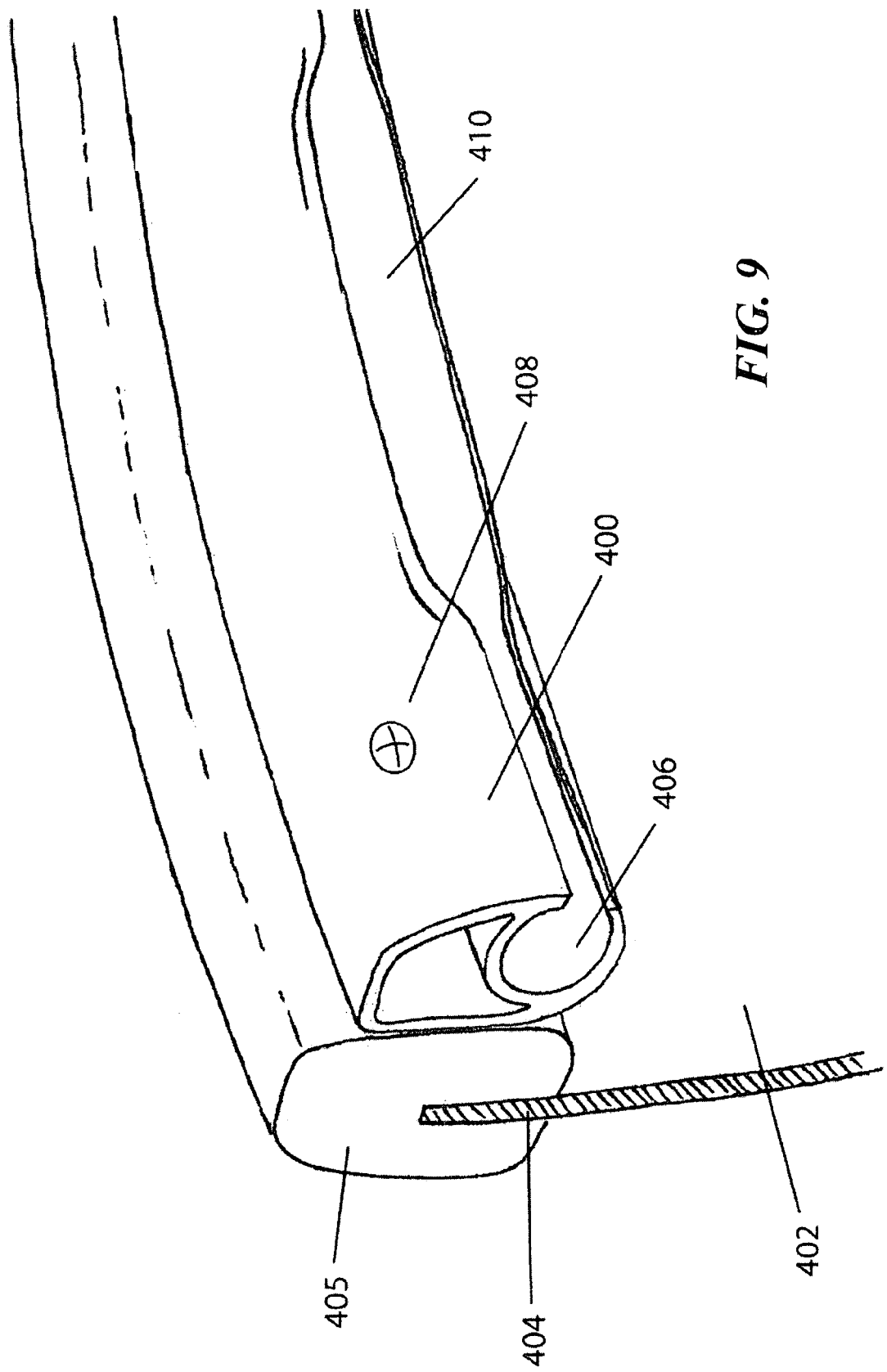
FIG. 9 is a perspective view of a fixture for attaching to a watercraft and a canoe sidewall and gunwale.

FIG. 9 is a perspective view of a fixture 400 for attaching to a watercraft having a hull including a sidewall 402 with an upwardly extending edge 404. The fixture 400 includes a boltrope slot 406 and a plurality of discrete attachment passageways 410 formed at spaced intervals in the slot 406 and a screw for attaching the fixture to the conventional gunwale 405 of the watercraft. The fixture could also be attached with a nut, bolt, clamp, bracket, pin, rod, or other fastener.

Figure 10:
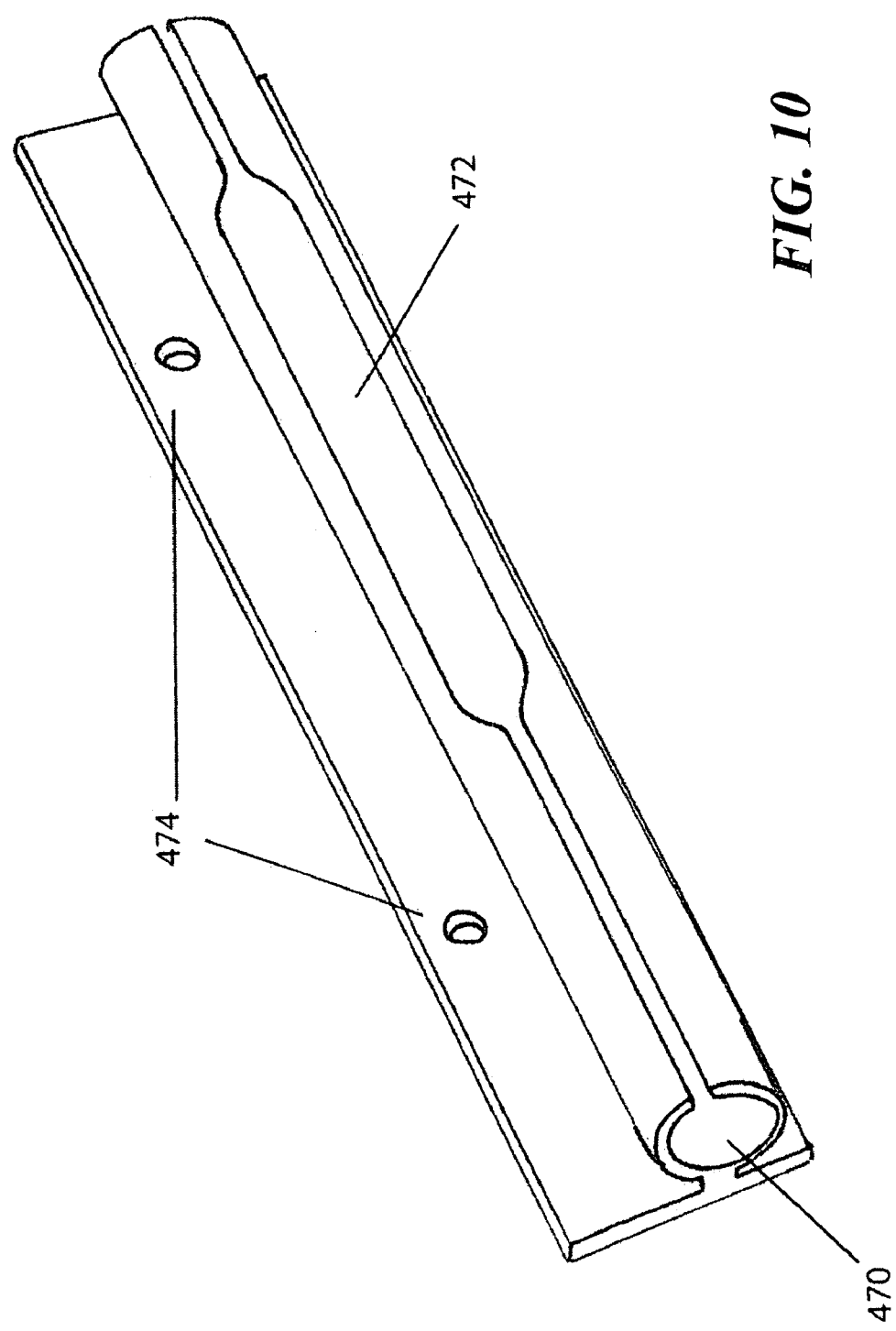
FIG. 10 is a perspective view of a fixture for attaching to a watercraft.

FIG. 10 is a perspective view of a fixture for attaching to a watercraft having a hull including sidewalls with an upwardly extending edge. The fixture includes an outwardly protruding portion 470 for attaching accessories having a C-shaped claw. In the preferred embodiment, the outwardly protruding portion of the fixture has a substantially circular cross section but it can also be T-shaped, triangular, egg-shaped, or comprise various forms. The fixture includes a screw or bolthole 474 for attaching the fixture to a watercraft and may further include indentations 472 where the C-shaped claw of the accessory can be inserted onto the outwardly protruding portion 470 of the fixture.

Figure 11:
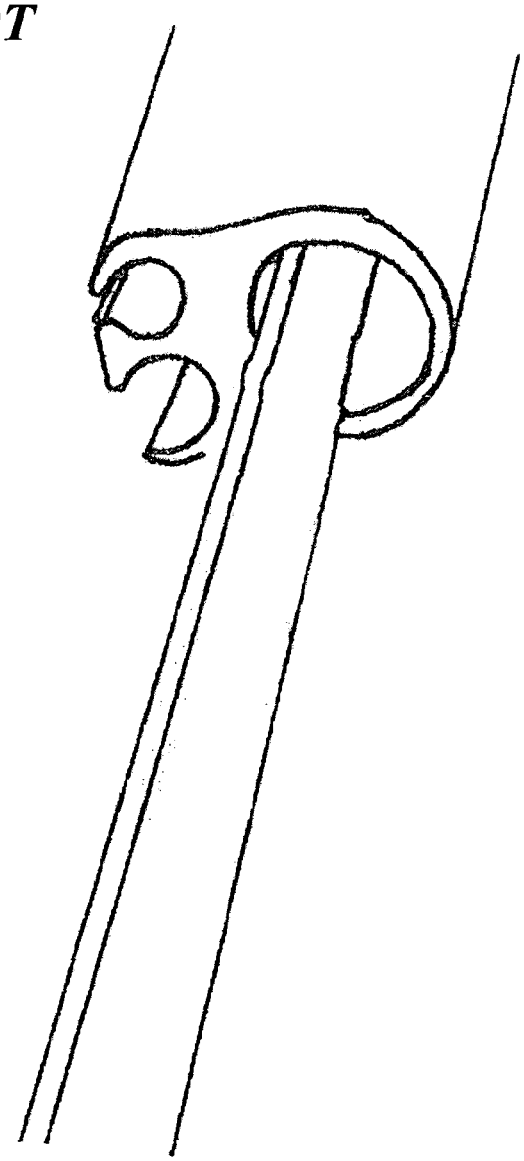
FIG. 11 is a perspective view of a cross section of an alternative embodiment of a gunwale for a watercraft.

FIG. 11 is a cross section of an alternative embodiment of a gunwale for a watercraft having a hull with insides and outsides and an upwardly extending edge 202. The alternative embodiment includes a plurality of boltrope slots 204 adjacent the inside of the canoe sidewall and an insert to cover fasteners 200 on the outside of the gunwale.

Figure 12:
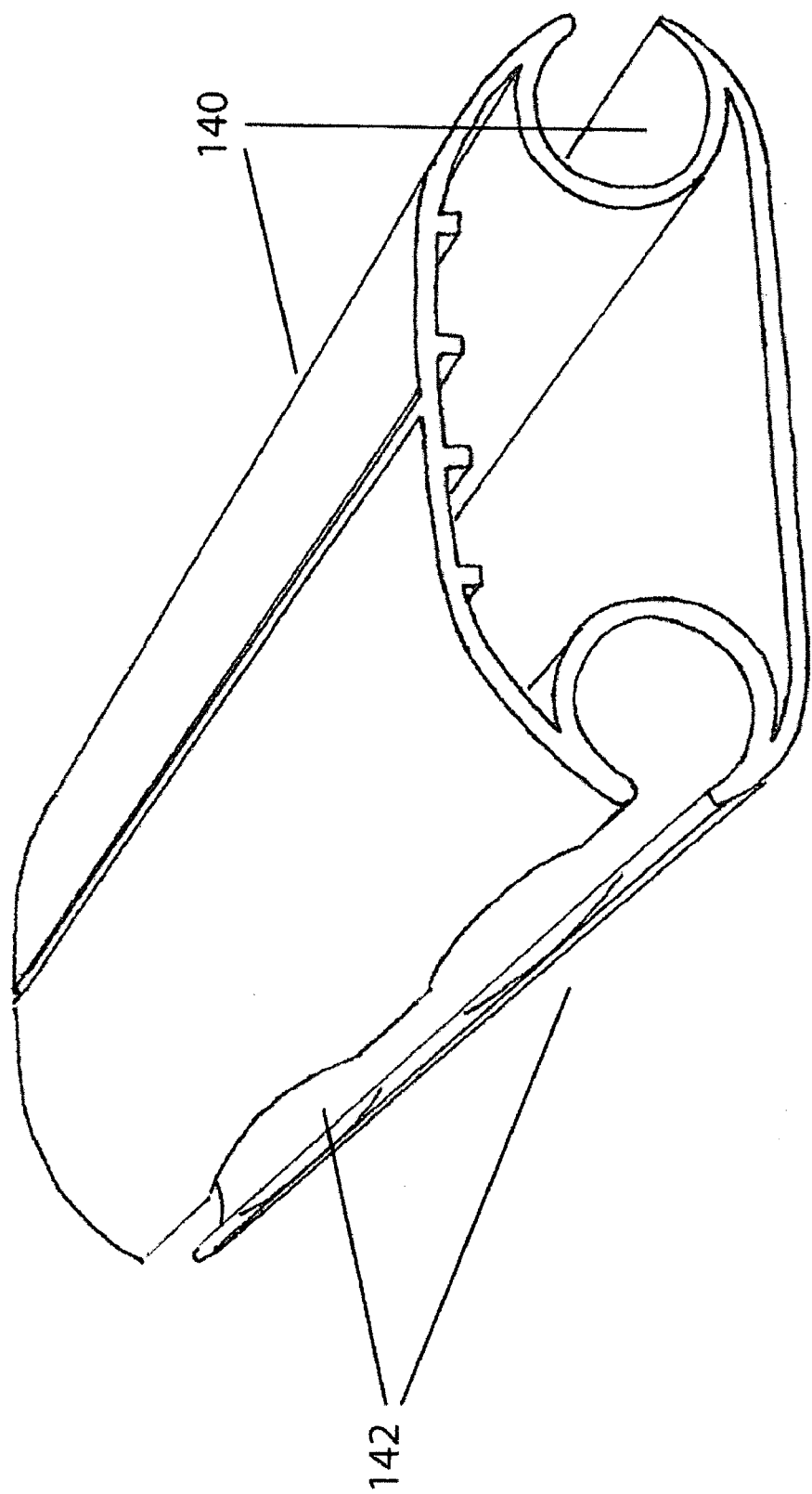
FIG. 12 is a perspective view of a thwart for a watercraft.

FIG. 12 is a perspective view of a thwart for a watercraft wherein the thwart includes at least one boltrope slot 140. The slot 140 can extend through the entire length of the thwart or may only extend a few inches or feet along the thwart. The thwart may further include a plurality of attachment passageways 142 for boltrope insertion at spaced intervals along the thwart.

Figure 13:
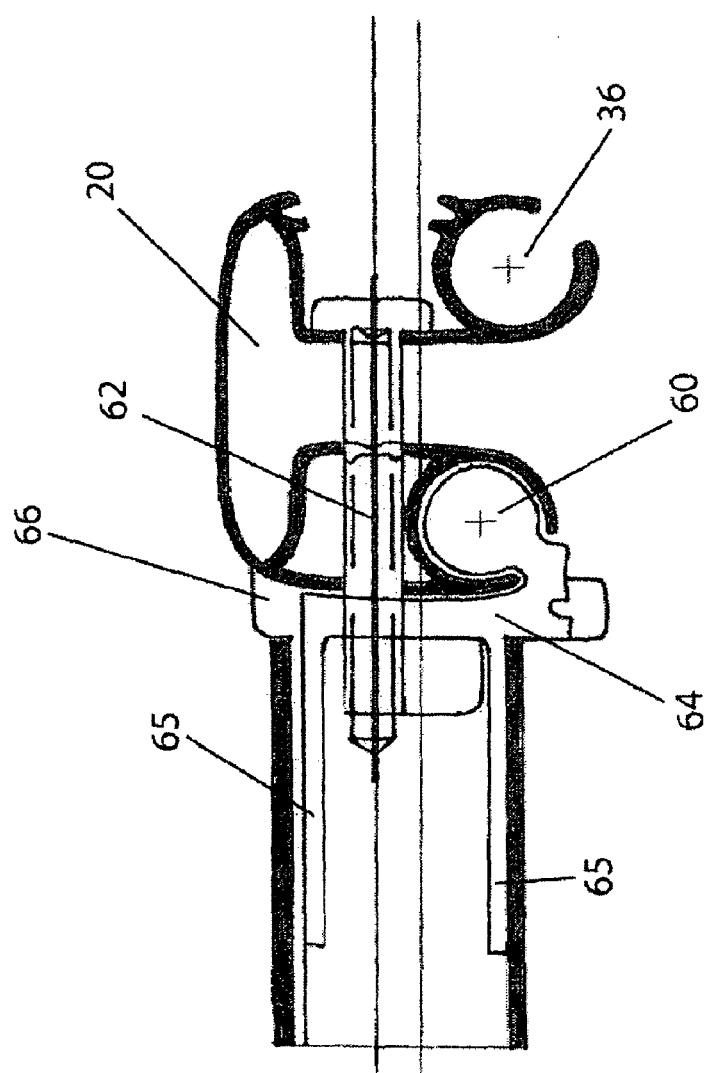
FIG. 13 is a side view of a thwart for a watercraft.
Figure 15:
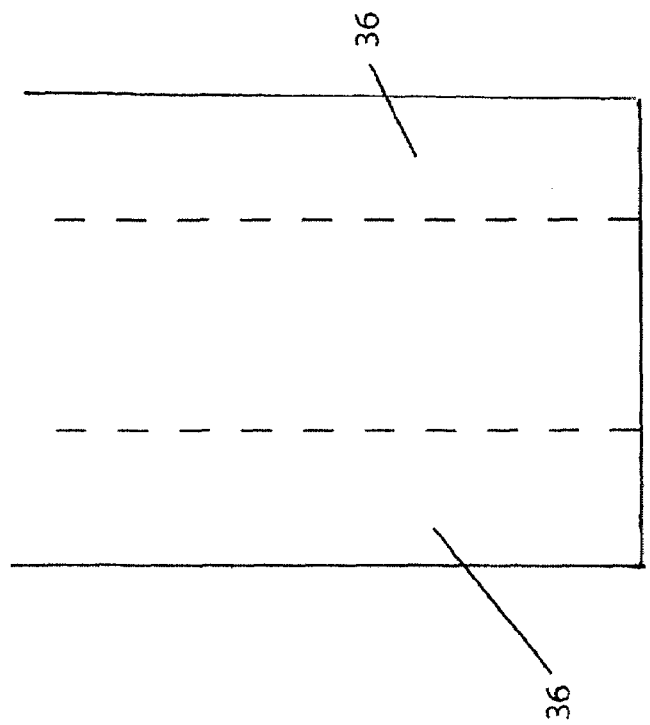
FIG. 15 is a top view of a thwart for a watercraft.
Figure 14:
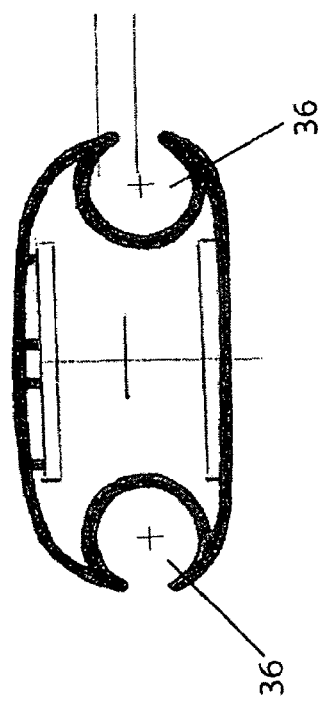
FIG. 14 is an end view of a thwart for a watercraft.
Figure 17:
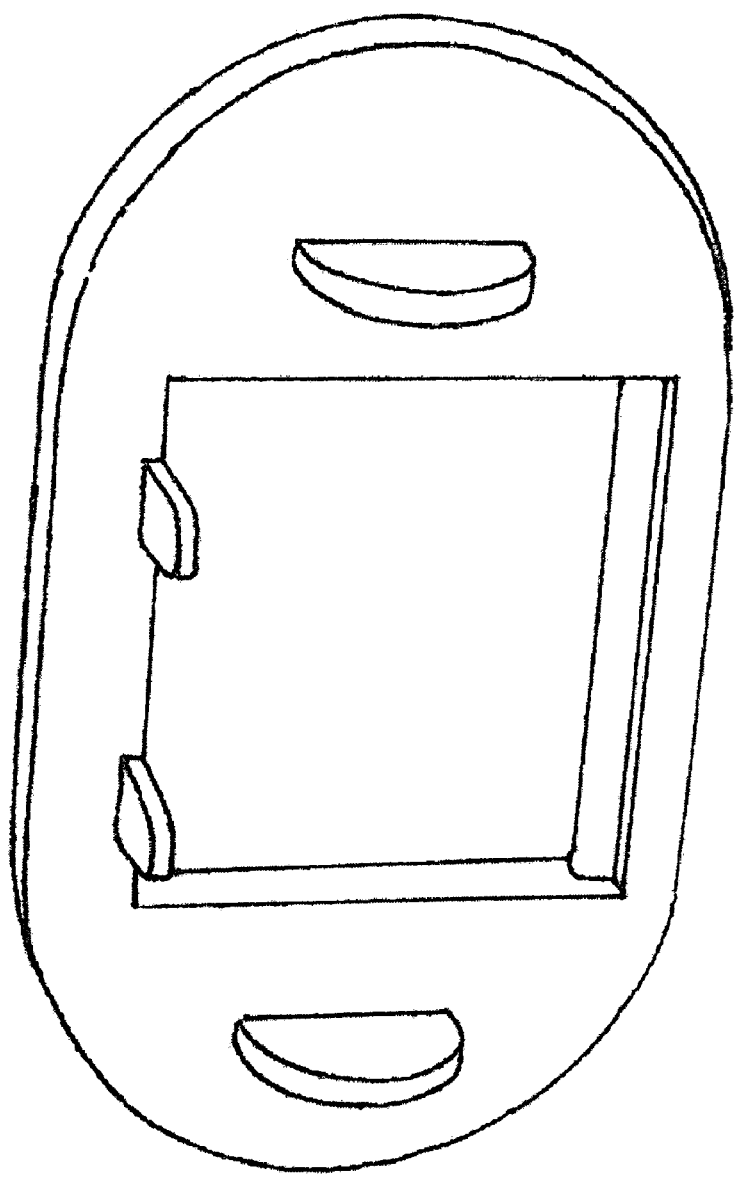
FIG. 17 is a view of a gasket for securing a thwart to a watercraft.

FIG. 13 is a side view of a thwart, with the gunwale shown in section. FIG. 14 is an end view of the thwart, and FIG. 15 is a top view of the thwart. The thwart is secured to the gunwale with a bolt 62 and bracket 64 having a boltrope-shaped lug 60, as shown in FIG. 16. A gasket 66, shown in FIG. 17, rests between the thwart and the gunwales and positions the thwart against the gunwale for securing the thwart against the gunwale. The thwart has an open end to receive flanges 65 on the bracket and extends across the watercraft transversely to the gunwales 20, as shown in FIG. 1. At the other side, a mirror image mount to the one shown in FIGS. 13–18 may be used. The lug 60 prevents transverse movement, and the bolt 62 prevents fore-and-aft movement.

Figure 18:
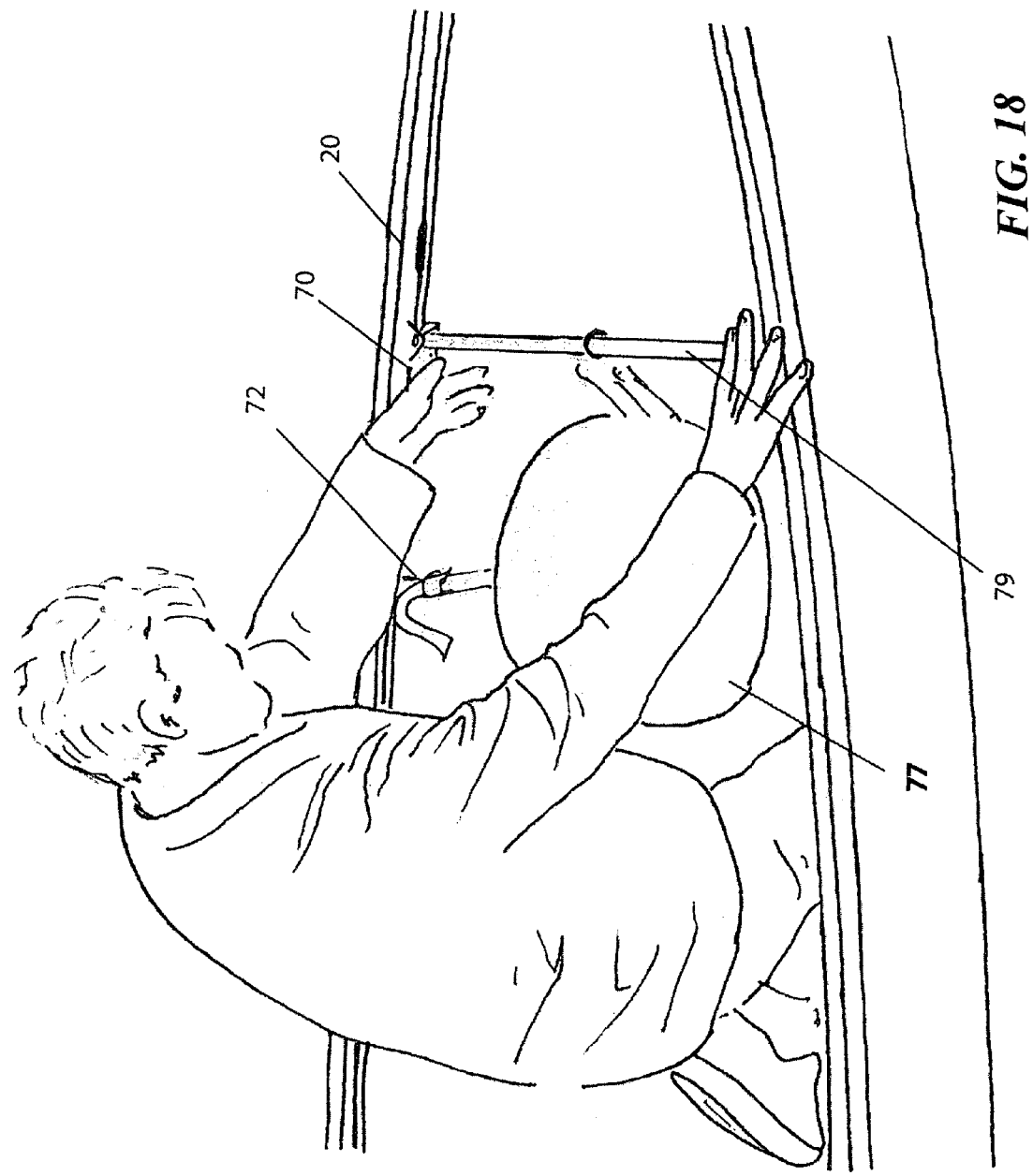
FIG. 18 is a perspective view of a watercraft including a seat assembly.
Figure 19:
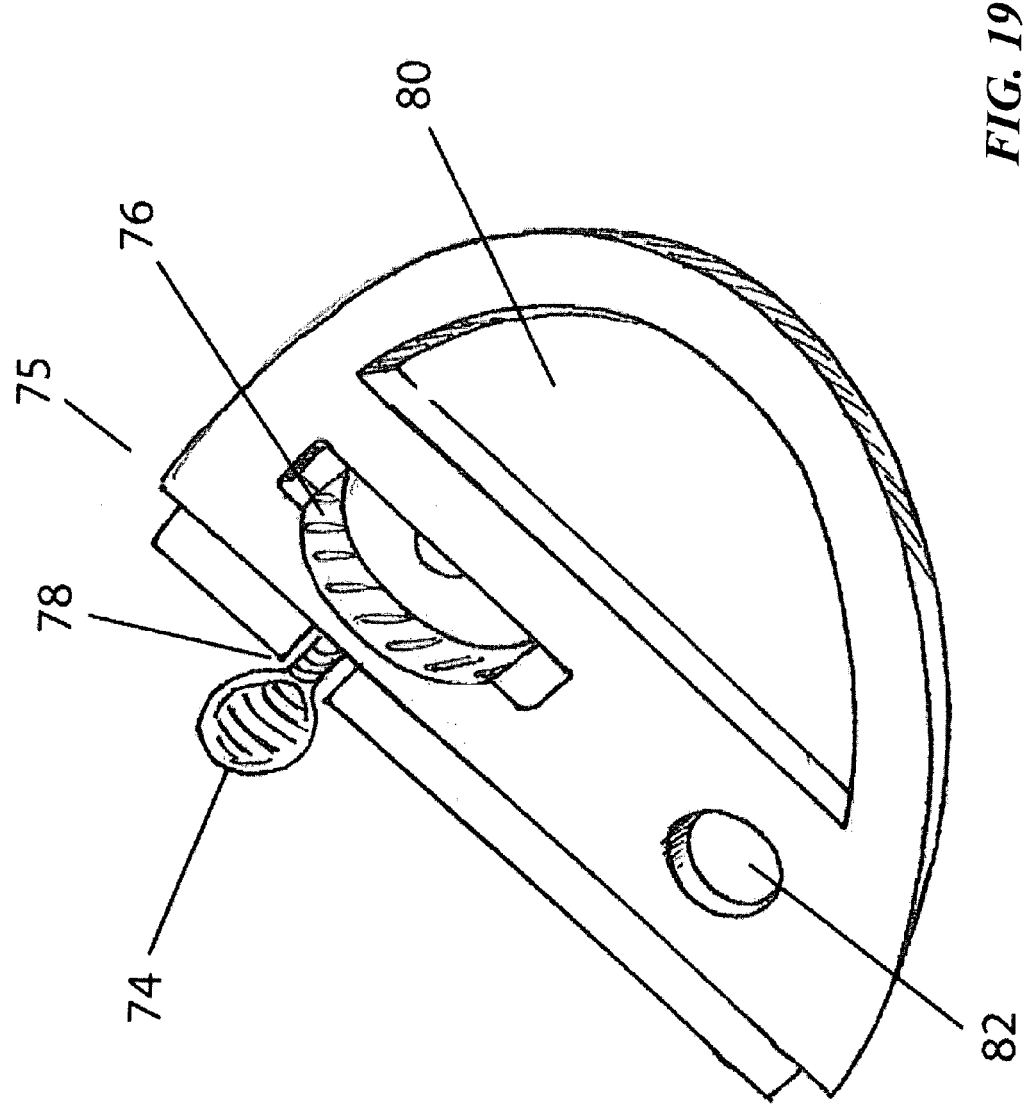
FIG. 19 is a perspective view of a bracket that can be securable into longitudinal slots in the inside faces of watercraft gunwales.

FIG. 18 is a perspective view of canoe including a seat assembly 70. The seat assembly 70 is slidably positionable fore and aft in the canoe and securable in the longitudinal slots in the inside faces of the canoe gunwales 20. The seat assembly 70 can be secured into the gunwales using brackets 75 that includes a nut 76 and bolt 78, seen best in FIG. 19. The bolt 78 includes a flanged head 74 that fits into the slot in the canoe gunwales. The nut 76 is hand tightenable and clamps the bolt head 74 against the inside face of the slot when the nut 76 is tightened. This prevents movement of the bracket 75 along the slot. The seat assembly includes a seat 77 that is supported at the back by a brace 79 that fits into the boltrope slots in the canoe gunwale 20. The brace 79 may be made as telescoping tubes, so the length can be infinitely adjusted to match the span across the gunwales. The height of the seat 77 at the back is adjustable via a slot in the back of the seat 77 and straps that secure the seat 77 to the brackets 75 in the front. The angel of the seat with respect to the bottom of the canoe can be changed using the slot in the back of the seat 77 and the straps that secure the seat 77 to the brackets 75 in the front. The bracket 75 also includes a D-shaped opening 80 where the straps for adjusting the positioning of the seat tie to the bracket. The bracket can also be used as a tie-down position in a lashing system and in various other applications. The bracket includes a hole 82 for receiving ropes. Without the seat, the bracket, with its bolt 78 and nut 76, can be used to prevent longitudinal movement of an inserted boltrope in the gunwale slot.

Figure 20:
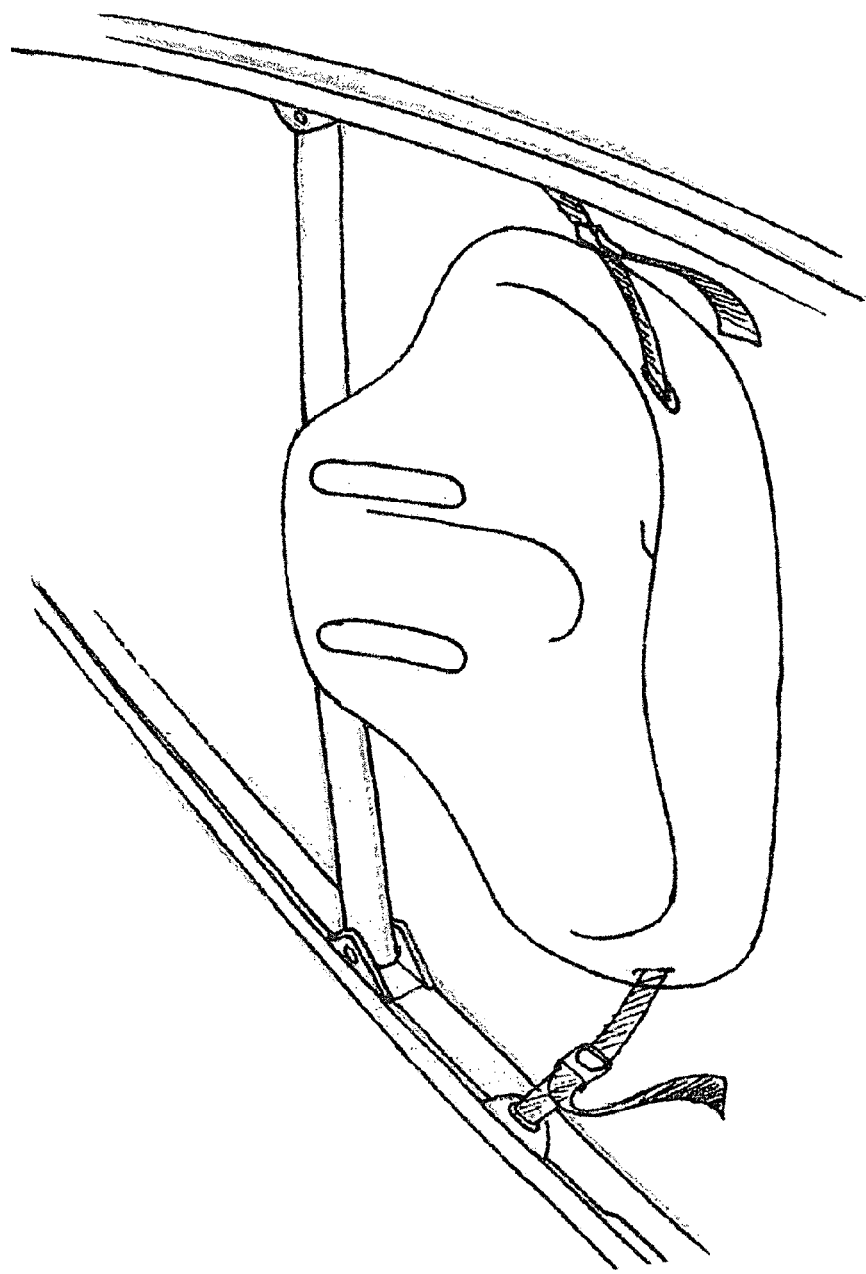
FIG. 20 is a perspective view of a seat assembly for a watercraft.
Figure 21:
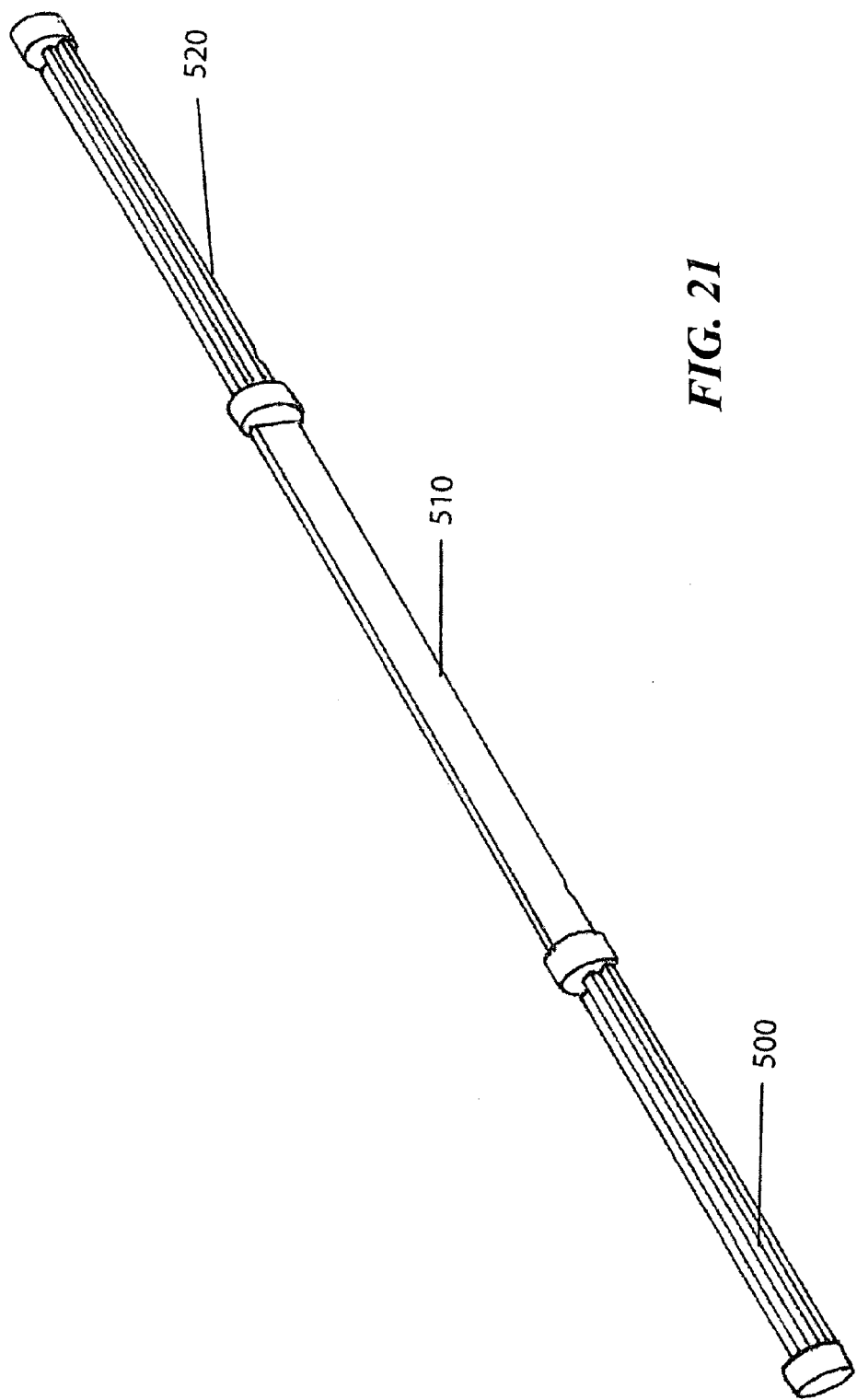
FIG. 21 is a perspective view of rod that fits into longitudinal slots in a gunwale for a watercraft for securing a seat in a watercraft.
Figure 22:
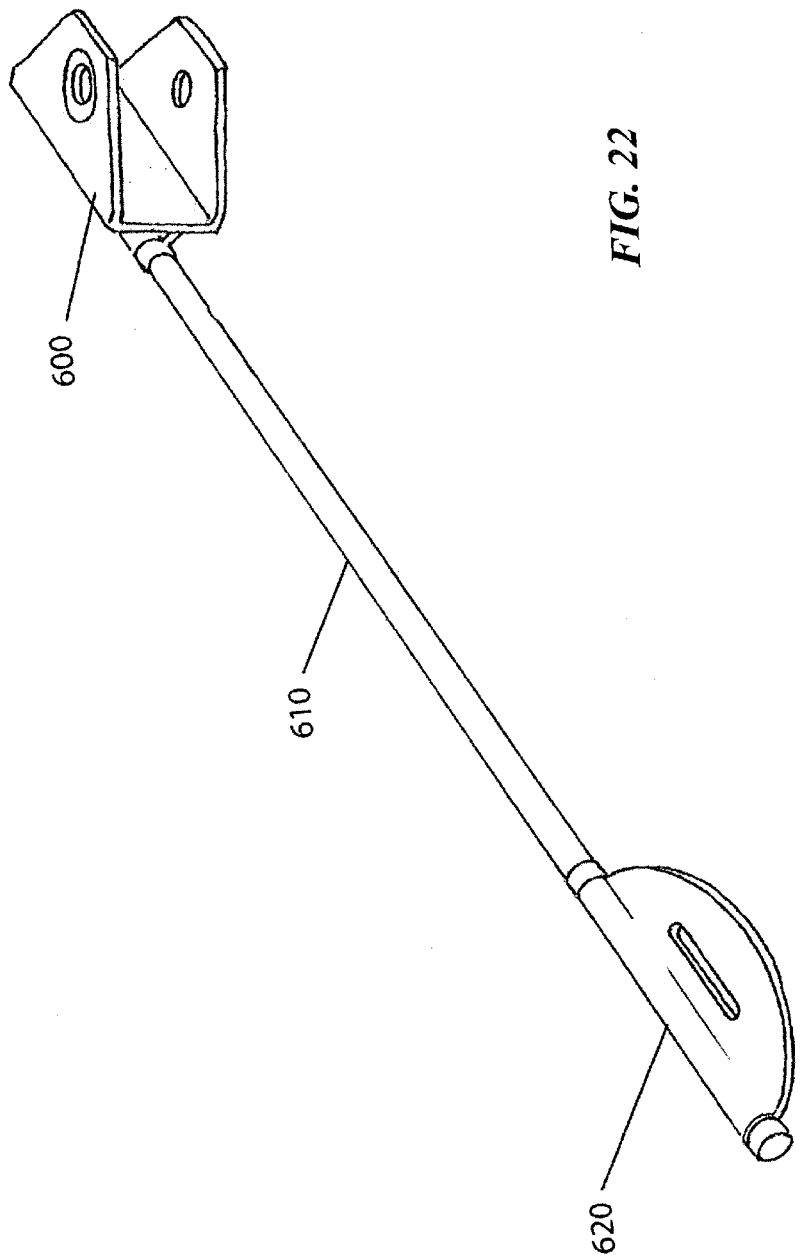
FIG. 22 is a perspective view of a rod, bracket, and seat strap device for securing a seat into a watercraft.
Figure 23:
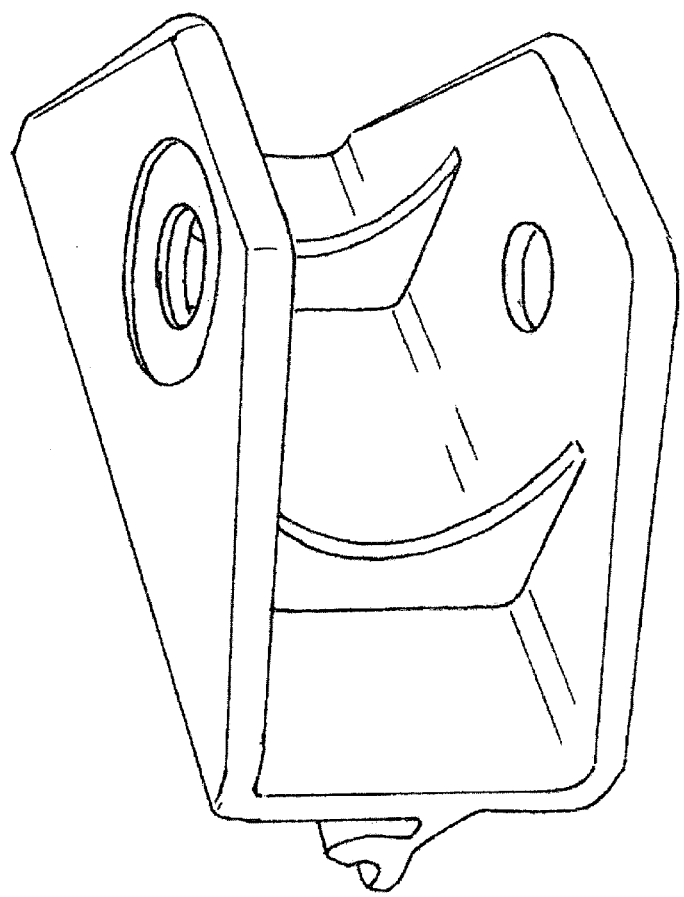
FIG. 23 is a perspective view of a bracket for securing a seat into a watercraft.
Figure 24:
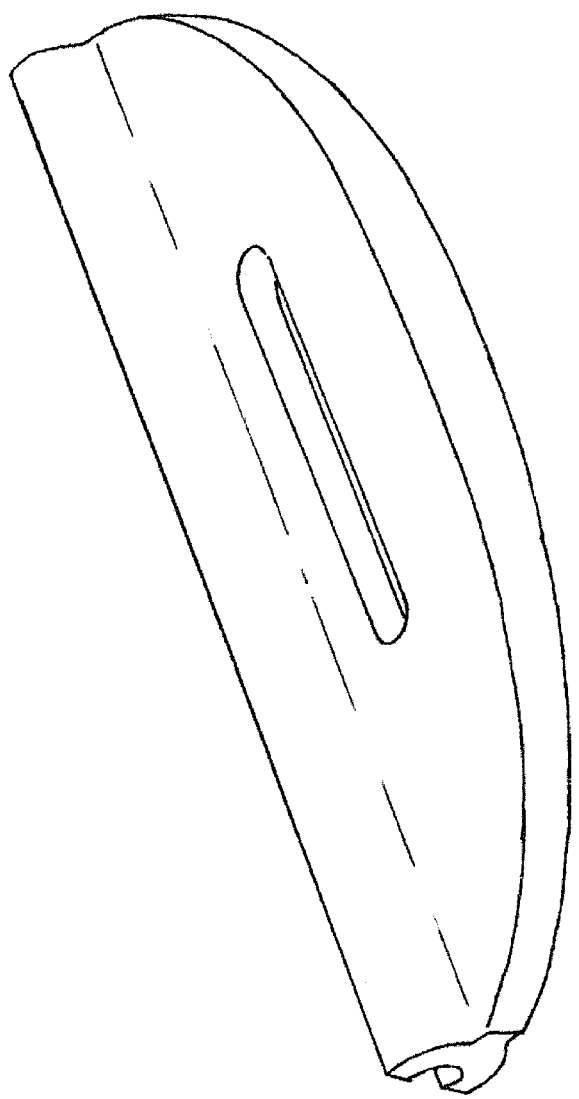
FIG. 24 is a perspective view of a seat strap device for securing a seat into a watercraft.
Figure 25:
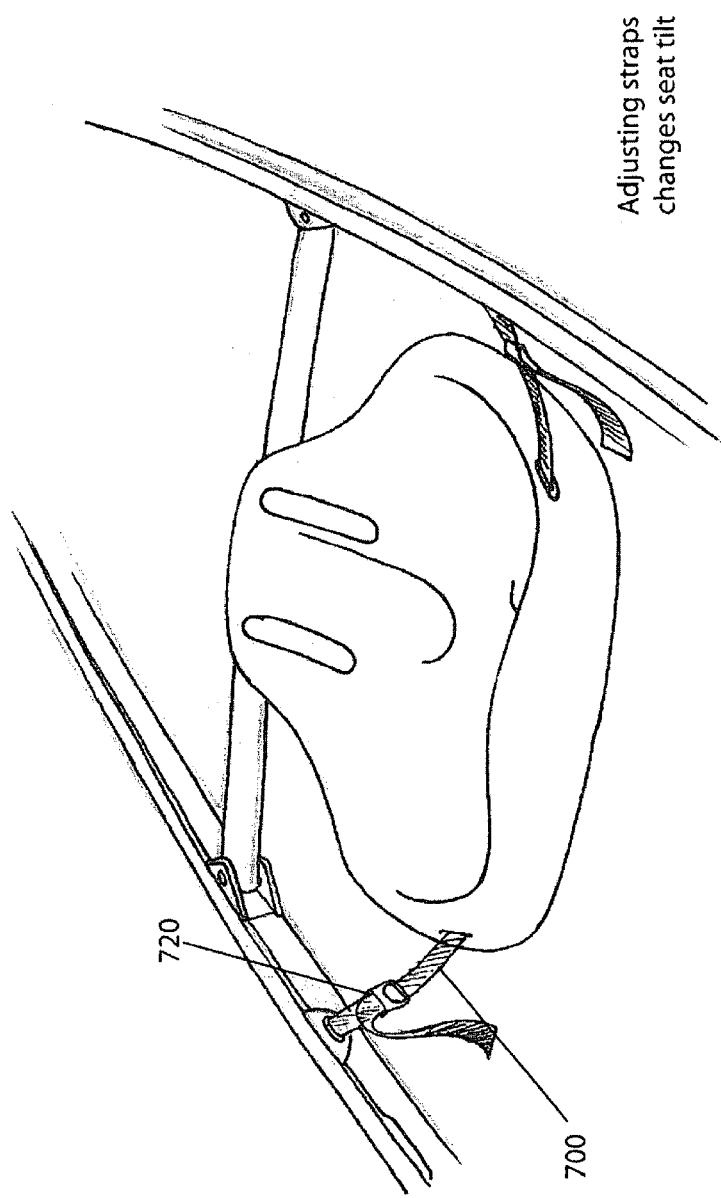
FIG. 25 is a perspective view of the seat straps for securing a seat into a watercraft.

FIG. 20 is a perspective view of a seat assembly for a canoe wherein the seat is slidably positionable fore and aft in the canoe. Fabric patches at the sides of the seat have boltropes that are selectively positionable along the gunwales. The seats can be attached to the gunwales via fabric, rod, or straps attached to boltropes that fit into the slots in the gunwales. FIG. 21 shows a rod that fits into the canoe gunwales for slidably securing the seat to the canoe gunwales. The rod has a narrow cylindrical portion at front 500 and back 520 connected by a flat-sided portion 510 in between. The front narrow portion of the rod 500 is for receiving and holding a seat strap device and the narrow portion at the back of the rod 520 holds a bracket for securing the seat into the canoe. FIG. 22 shows the rod 610, bracket 600, and seat strap device 620 together without the canoe gunwales. FIGS. 23 and 24 are perspective views of the seat strap device and the bracket, respectively, for securing the seat into the canoe. FIG. 25 shows the seat straps 700 and an adjustment buckle 720 at the front of the seat for adjusting the angle of the seat with respect to the canoe bottom.

Figure 26:
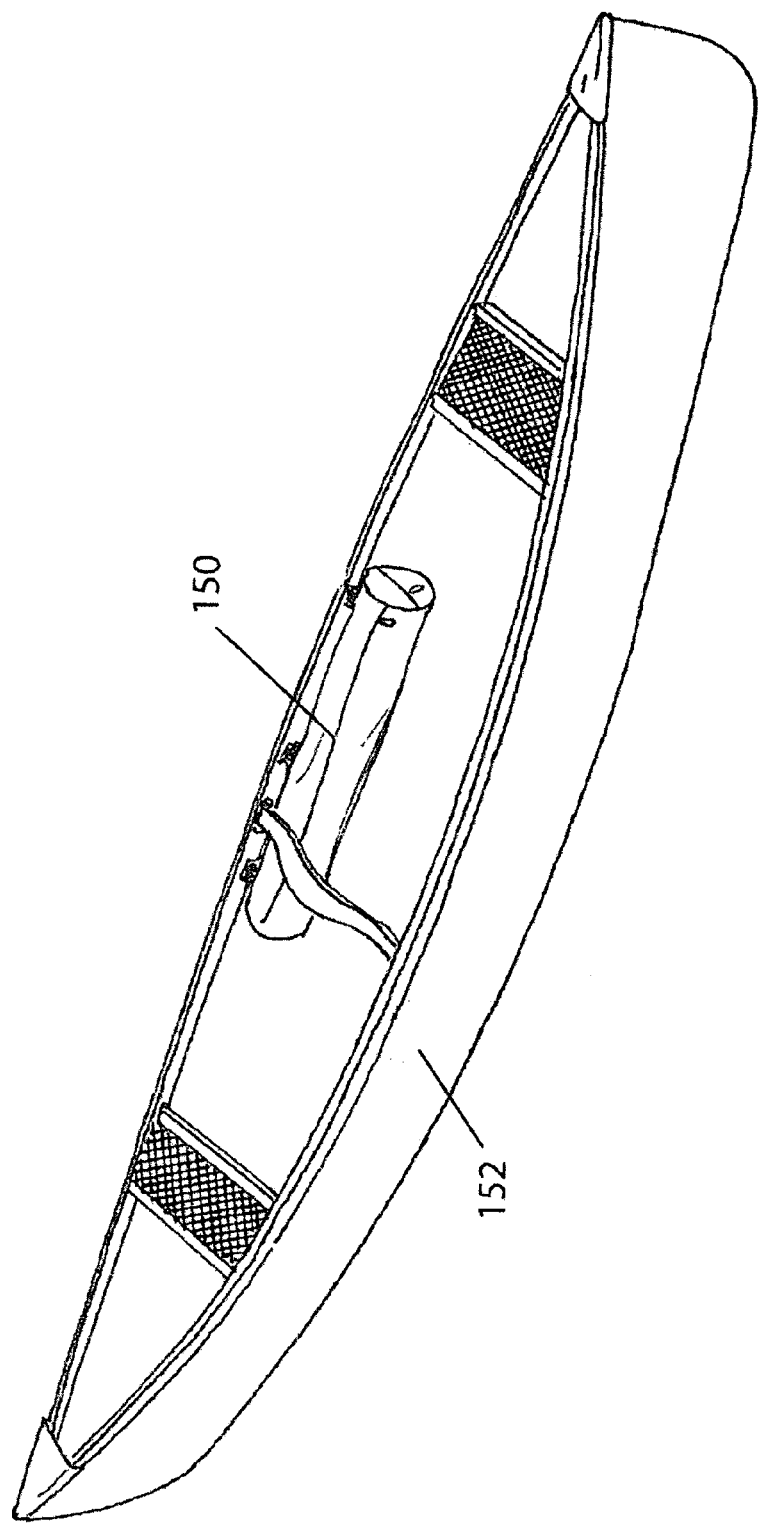
FIG. 26 is a perspective view of a canoe including a dry bag and/or sponson for a watercraft.

FIG. 26 is a perspective view of a canoe including a dry bag 150 and/or sponson 152 having an elongated thickened portion inserted into the canoe gunwale. The sponson is a flotation device for preventing the canoe from capsizing in rough water conditions.

Figure 27:
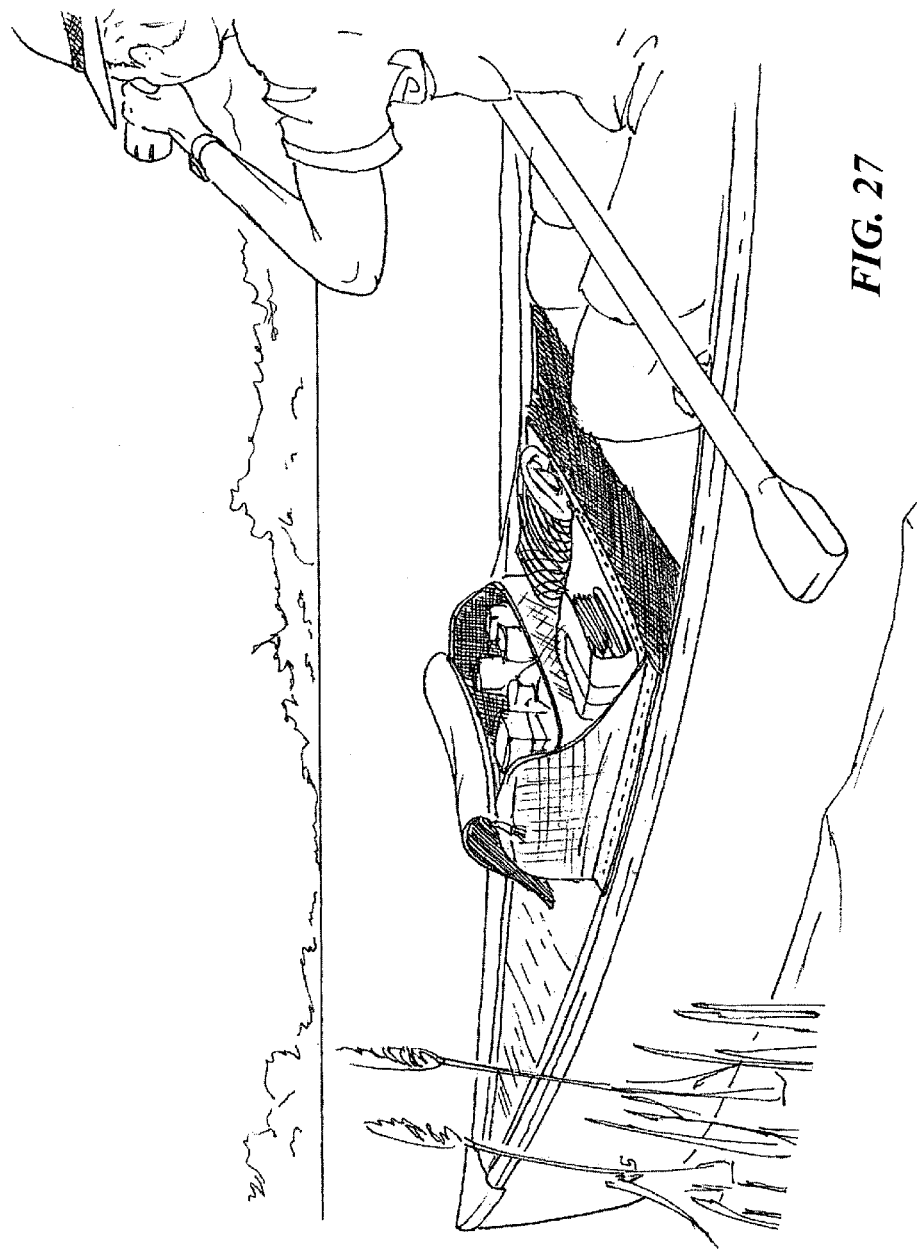
FIG. 27 is a perspective view of a multi-use workstation for a watercraft.

FIG. 27 is a perspective view of a multi-use workstation having an elongated thickened portion inserted into the canoe gunwale. The workstation is mounted on a platform secured in the gunwale slots, and the platform may be a fabric for ease of installation because of its flexibility or rigid for functional stability. Various details such as wine glass securing slots or other features can be molded into the workstation. As with the belly cover of FIG. 30, the workstation may be laced to supports in the slots. The workstation can be used for holding accessories for activities including navigating, hunting, fishing, bird watching, drawing, and other recreational activities. It can also serve as a kitchen for preparing meals on the canoe.

Figure 28:
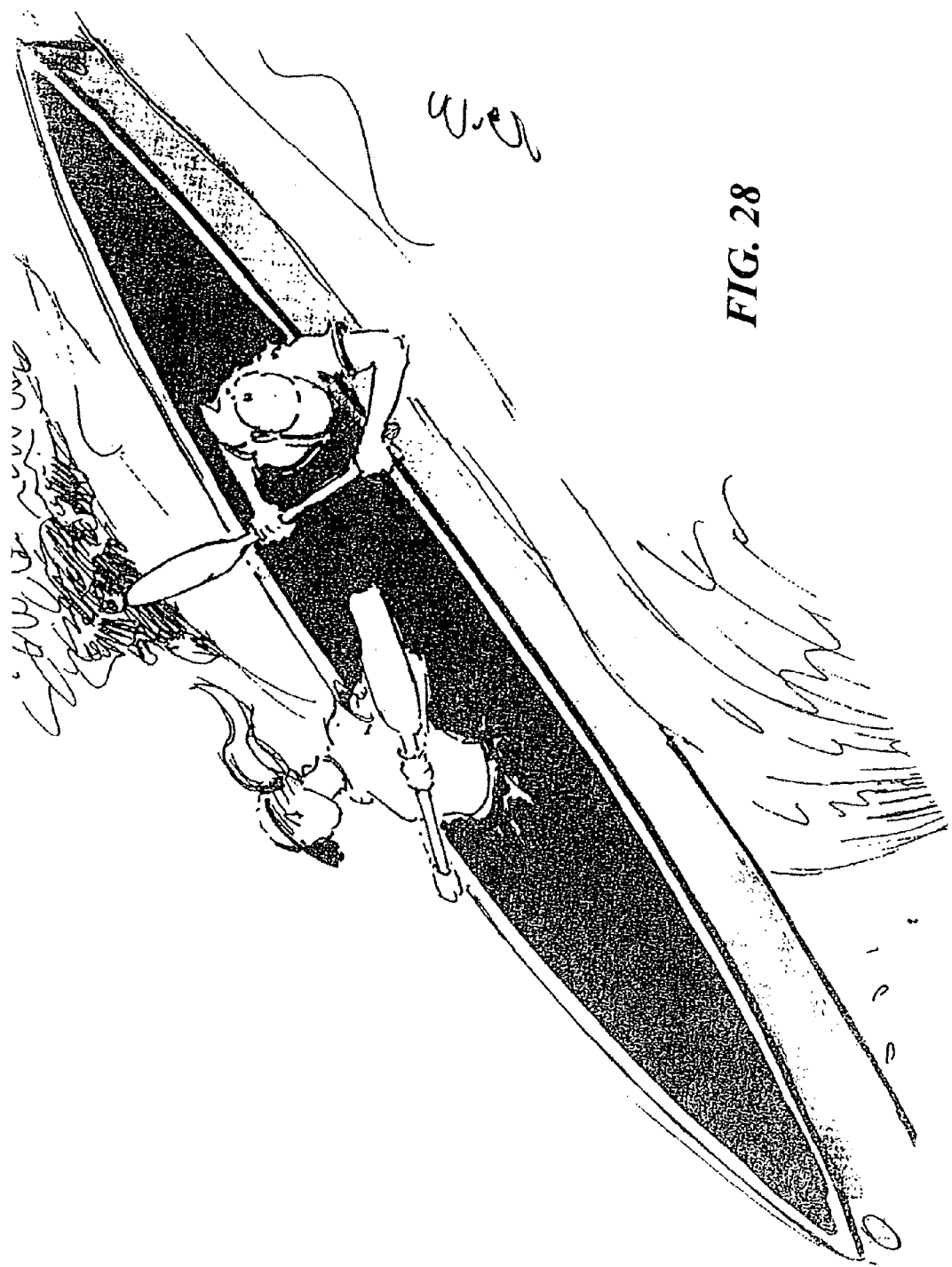
FIG. 28 is a perspective view of a skirt on a canoe.

FIG. 28 is a perspective view of a canoe with a skirt having an elongated thickened portion inserted into the canoe gunwale. The skirt prevents water from entering the canoe during paddling in whitewater conditions.

Figure 29:
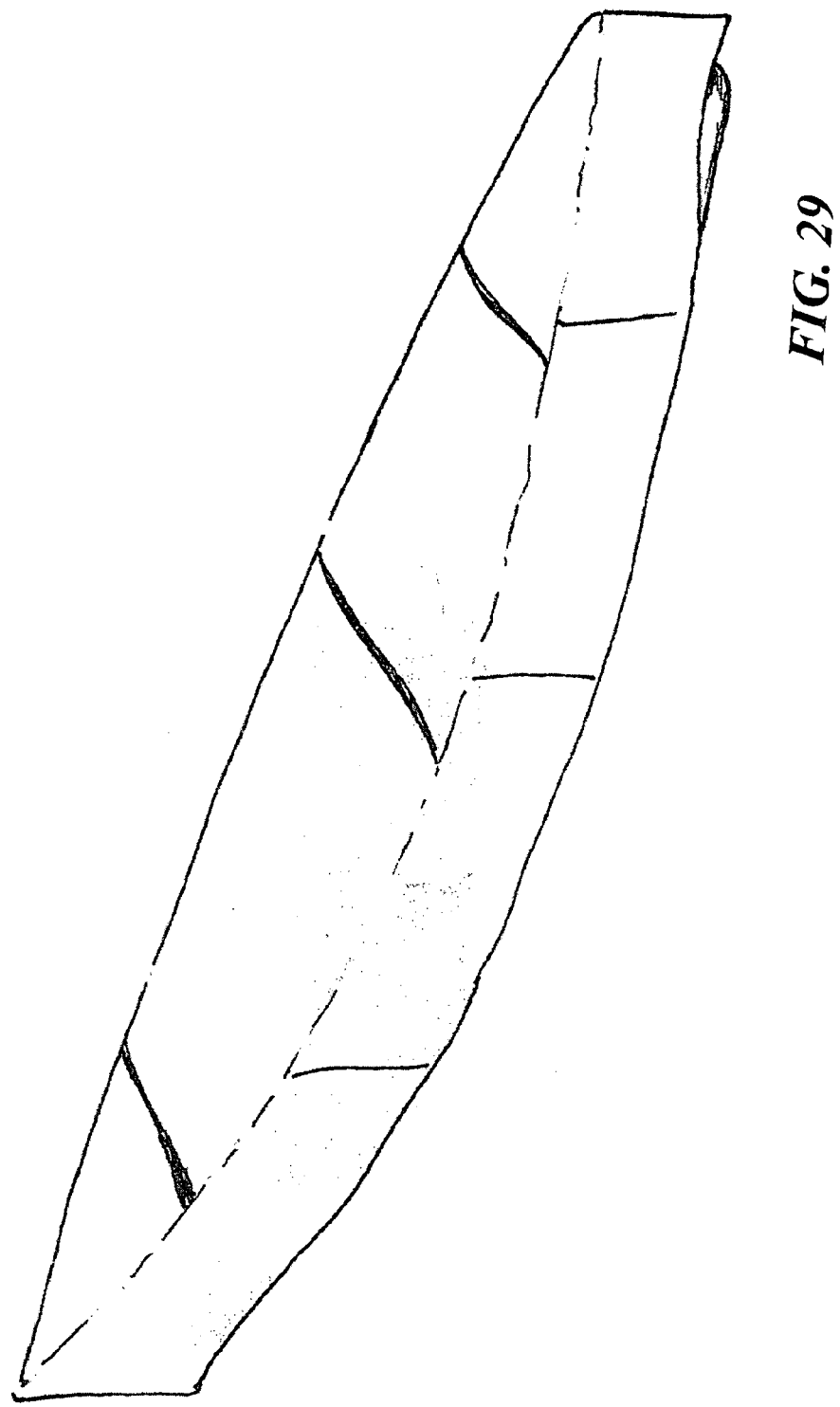
FIG. 29 is a perspective view of a hunting blind with a canoe.

FIG. 29 is a perspective view of a hunting blind having an elongated thickened portion inserted into the canoe gunwale. The hunting blind may include a skirt for camouflaging the canoe sidewalls against the surrounding terrain and a tent overhead to shield the occupants.

Figure 30:
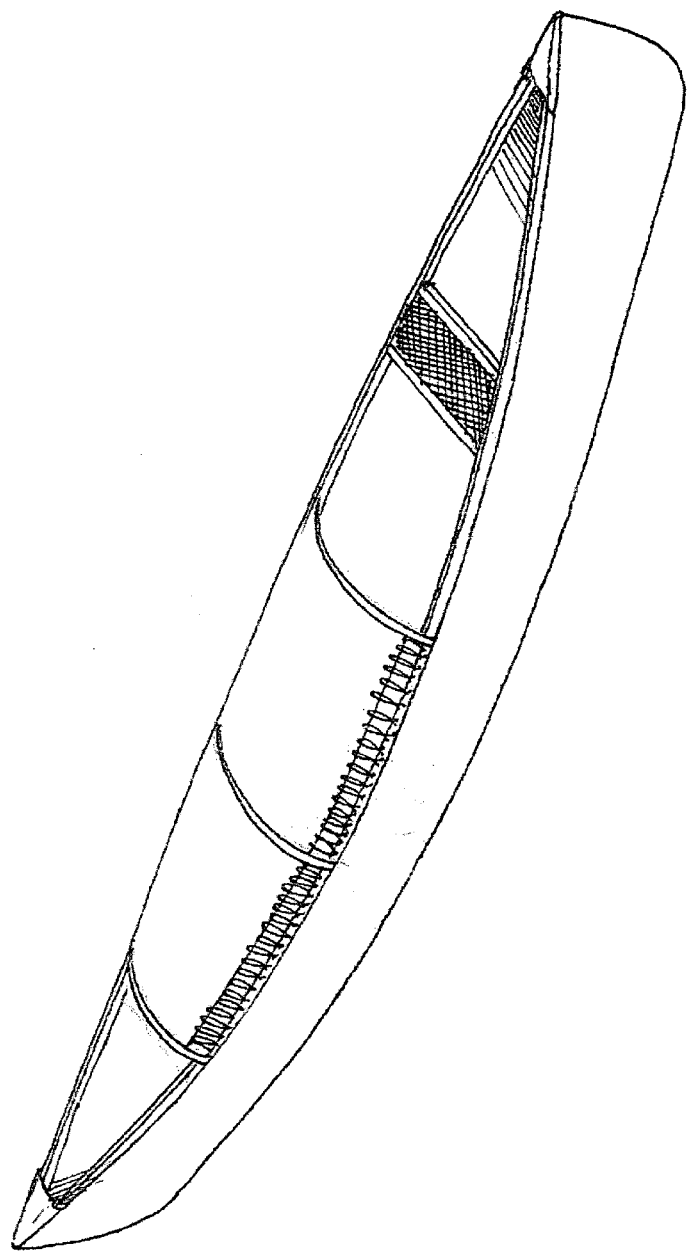
FIG. 30 is a perspective view of a belly cover on a canoe.

FIG. 30 is a perspective view of a belly cover having elongated thickened portion inserted into the outside slot in the canoe gunwale. The belly cover may be used to provide shade or to repel water. The cover includes a fabric which is laced to the portions secured in the slot.

Figure 31:
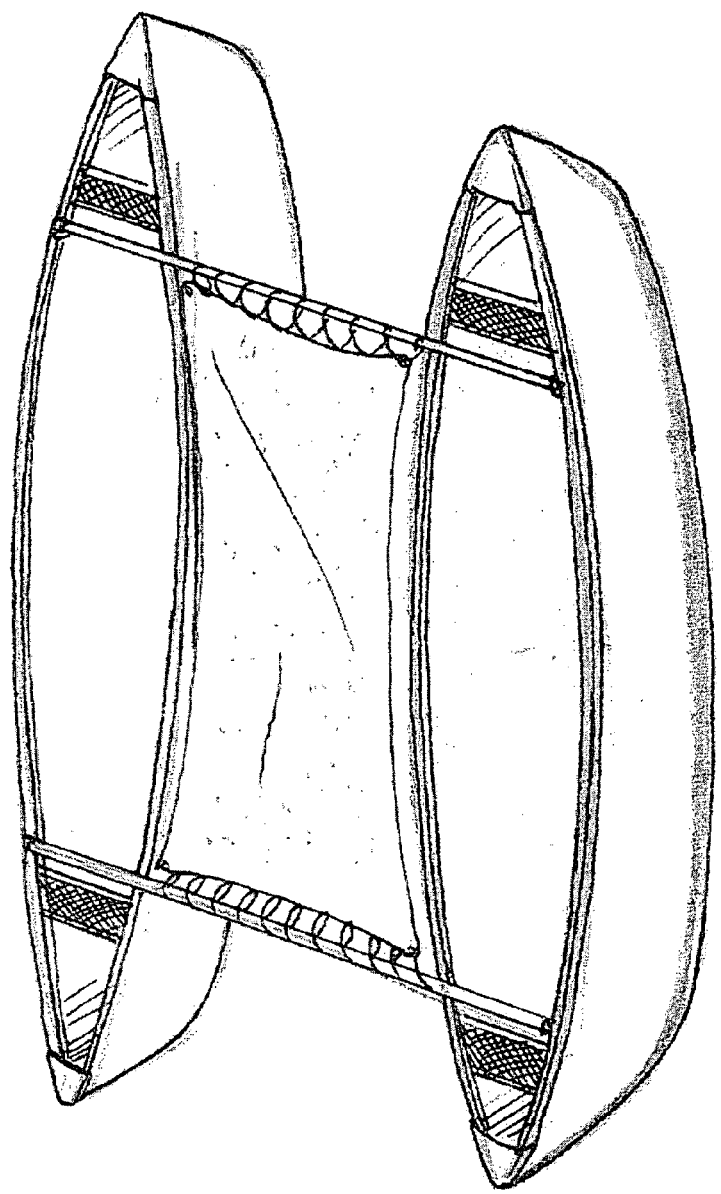
FIG. 31 is a perspective view of a pontoon-catamaran link up.

FIG. 31 is a perspective view of a pontoon-catamaran link up having an elongated thickened portion inserted into the canoe gunwale. The catamaran links may be mounted similarly to the thwart mountings described above.

Figure 32:
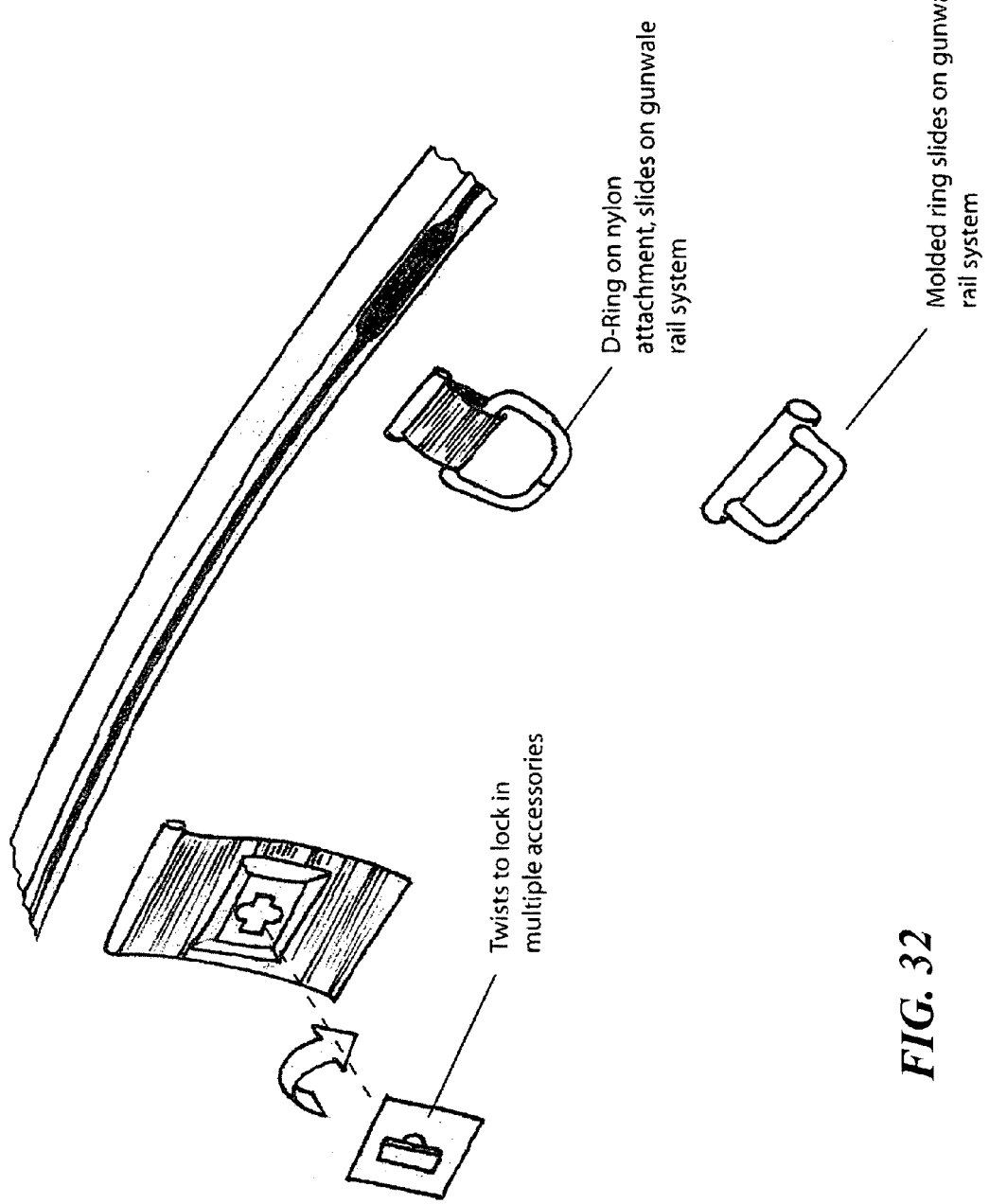
FIG. 32 is a perspective view of an improved canoe gunwale including a D-ring and a universal mount.

FIG. 32 is a perspective view of a canoe including a D-ring having an elongated thickened portion inserted into the canoe gunwale. This figures also shows a universal mount with its own attachment aperture to receive a suitably shaped mount on an accessory. The mount has an elongated thickened portion for insertion into improved gunwales of watercraft.

Figure 33:
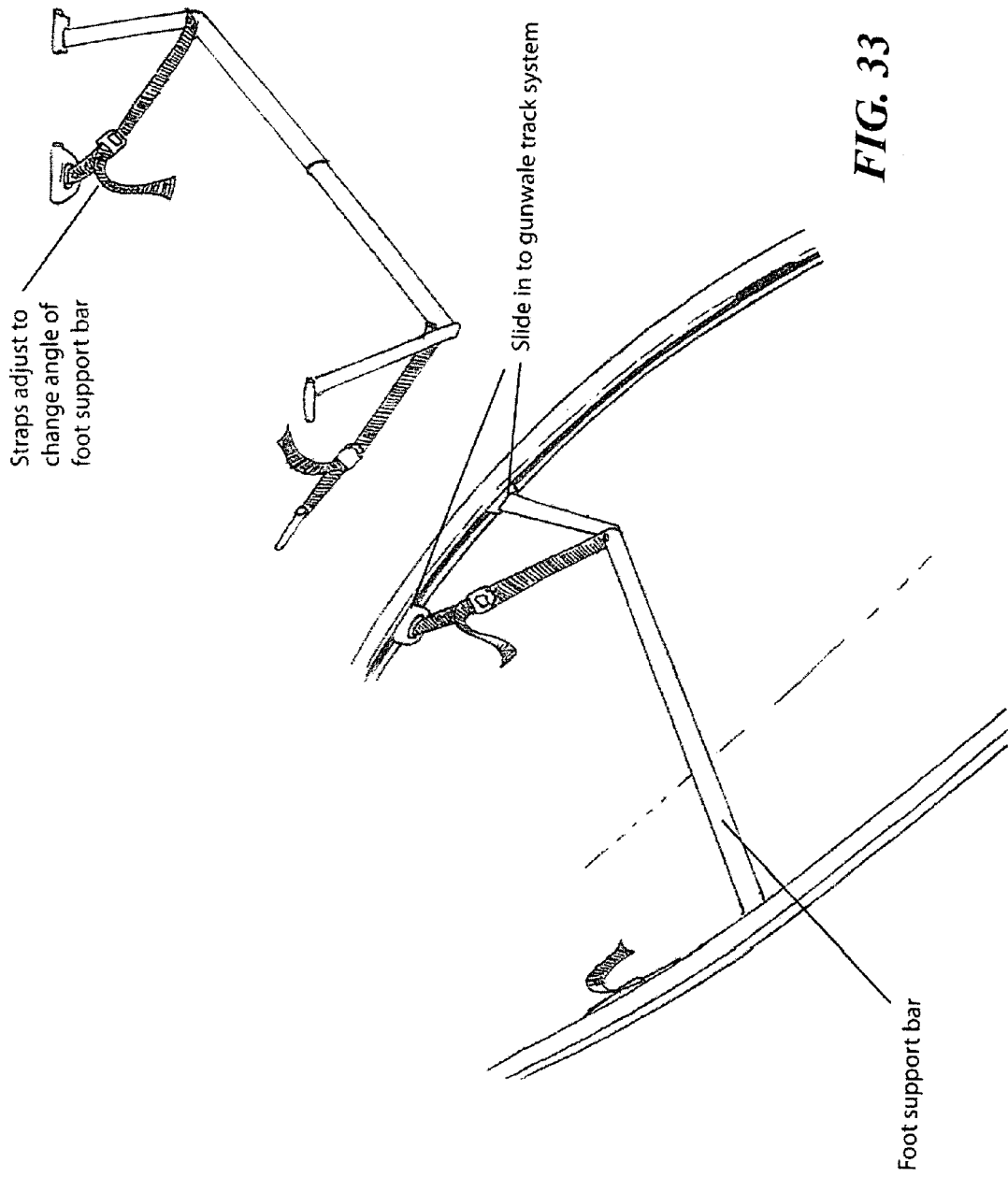
FIG. 33 is a perspective view of an improved adjustable foot brace for a watercraft.

FIG. 33 is a perspective view of an adjustable foot brace rail having an elongated thickened portion inserted into the canoe gunwale. Two fittings fit in opposite gunwale slots and depending legs support a transverse bar with the actual footrest.

Figure 34:
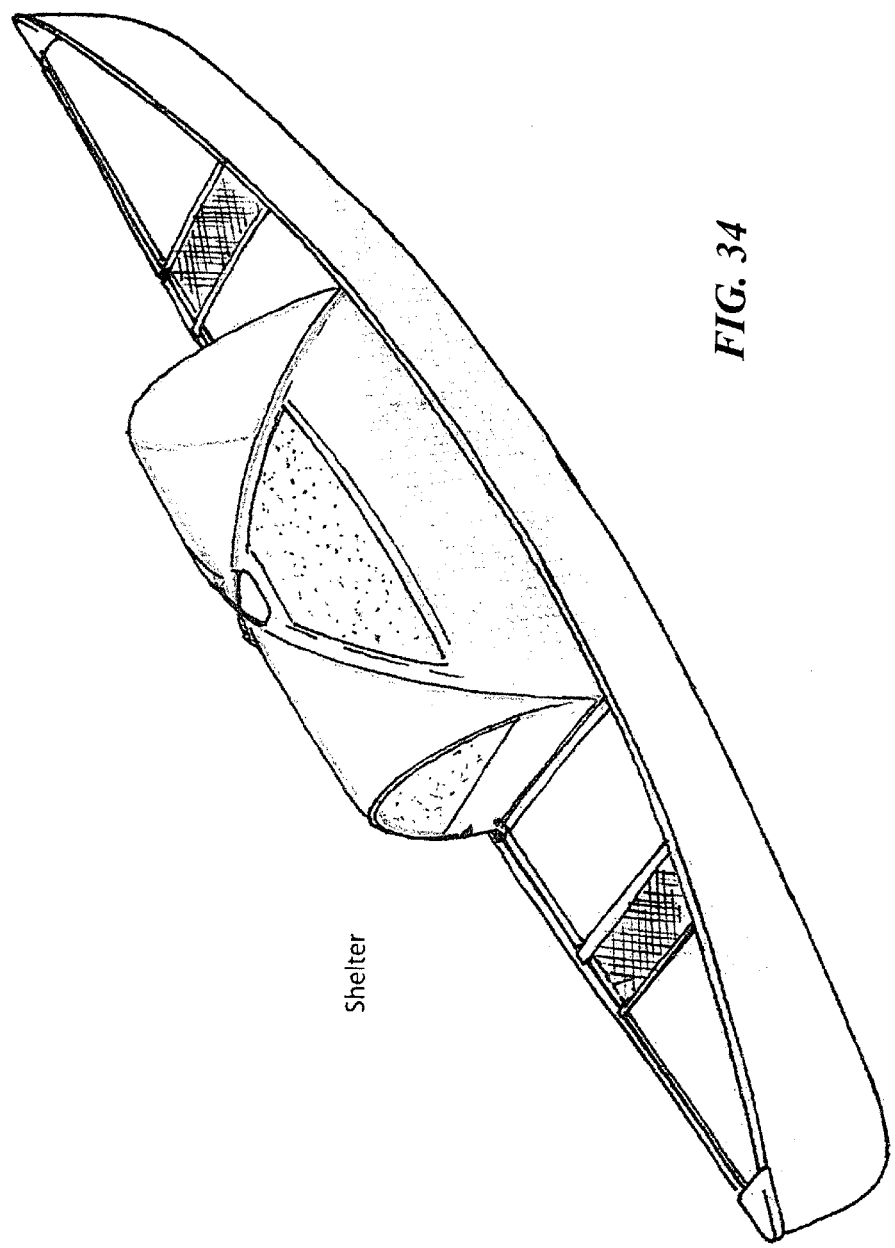
FIG. 34 is a perspective view of an improved shelter for a watercraft.

FIG. 34 is a perspective view of a shelter having an elongated thickened portion inserted into the canoe gunwale. The shelter forms a tent-like canopy supported on aching flexible struts that fit into the gunwale slots. The "tent" ends may be configured like conventional tents.

Figure 35:
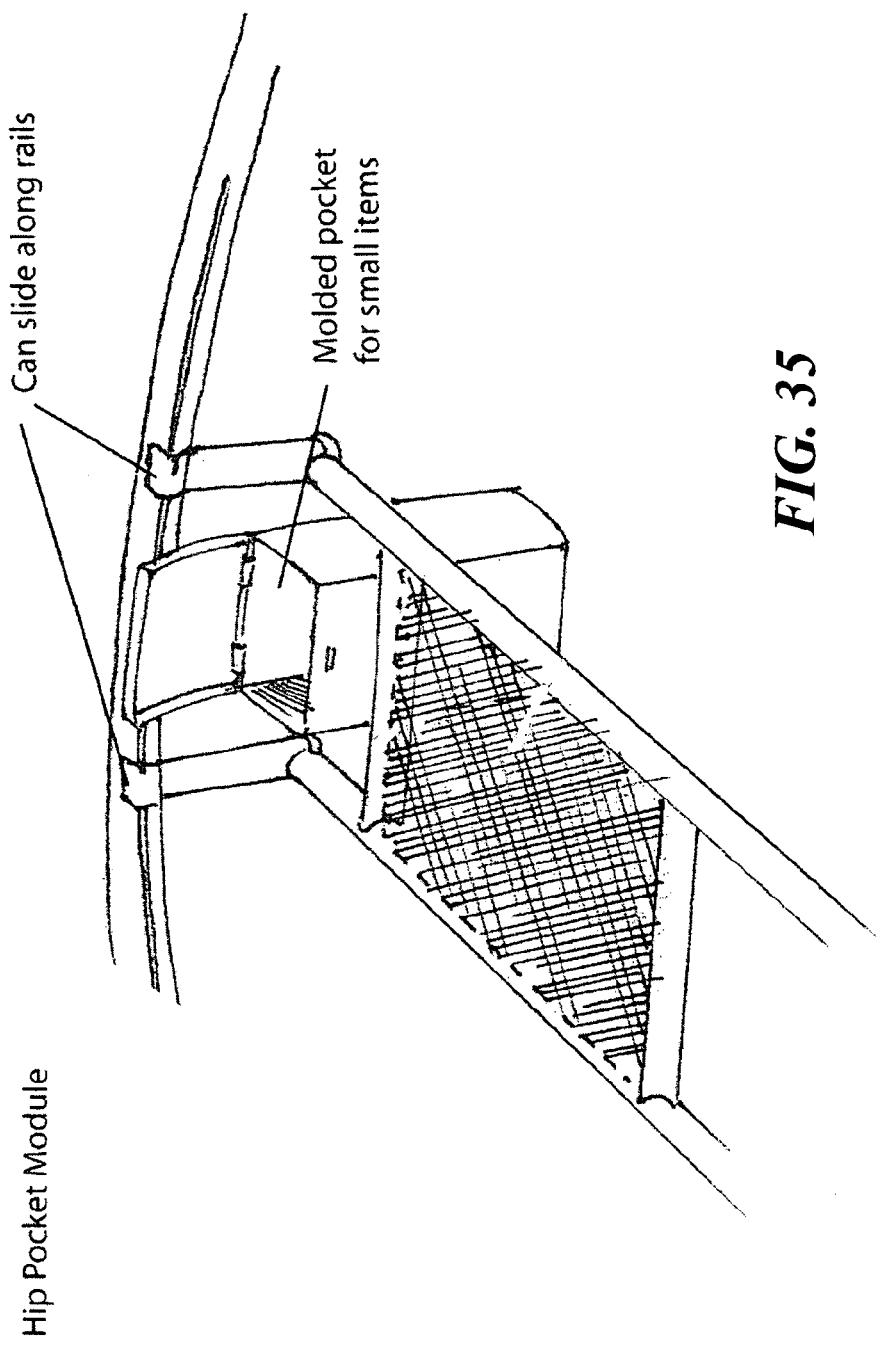
FIG. 35 is a perspective view of an improved hip pocket module for a watercraft.

FIG. 35 is a perspective view of a hip pocket module having an elongated thickened portion inserted into the canoe gunwale. It is configured to be a convenient carrying bag for placement near a paddler.

FIG. 36 is a perspective view of a suspended storage compartment having an elongated thickened portion inserted into the canoe gunwale. A cooler or other item can be placed in the compartment to secure the cooler in position.

FIG. 37 is a perspective view of a paddle or rod holder having an elongated thickened portion inserted into the canoe gunwale. The holder has two positions; one being slung inside the canoe to hold a fishing rod in a fore-and aft extending channel and the other being pivoted over the gunwale exposing a notch to receive a fishing pole or paddle.

The invention has been shown with the slots extending substantially the full length of the canoe, but intermittent or shorter slots, and slots located other than in the gunwales (like the thwart of FIG. 12) are also within the scope of the invention. In addition, the invention can be realized as an add-on to a more conventional gunwale, including a slot-supporting fixture capped by a more conventional gunwale, such as one made of wood. The gunwales can be constructed of aluminum, molded plastic, vinyl, and other materials or may be realized by a channel routed within a wood gunwale.

We claim:

1. A canoe, comprising:
   a. a canoe hull including two opposite sidewalls each having an upward extending edge;
   b. a gunwale securely attached to each said sidewall and extending over said upward extending edge, each said gunwale including an inside surface, an outside surface, and a top hand surface, said gunwale includes an inside cavity and a downward extending, longitudinally aligned boltrope slot formed therein that substantially extends the entire length of said gunwale that provides access to said inside cavity, and;
   c. a sliding attachment means that extends through said boltrope slot and engages said inside cavity formed on each said gunwale, said sliding attachment means being used to attach an object to said gunwale.

2. The canoe, as recited in claim 1, wherein said sliding attachment means is an adjustable bracket capable of sliding inside said boltrope slot and selectively locked in a fixed locations, said adjustable bracket includes flat body with a recessed guide surface formed thereon that fits inside said boltrope slot when said bracket is longitudinally and perpendicularly aligned with said boltrope slot, a strap opening and a nut slot formed on said body, a bolt perpendicularly aligned on said body, said bolt includes a threaded shaft and a flanged head that is positioned adjacent to guide surface, a threaded nut disposed inside said nut slot formed on said body and attached to said threaded shaft, whereby when recessed guide surface is inserted into said boltrope slot on said gunwale, and said nut is tightened, said flange head is forces against the insides surface of said boltrope slot thereby securely attaching said bracket in a lock position on said gunwale.

3. The canoe, as recited in claim 1, wherein said boltrope slot is formed on said outside surface of said gunwale.

4. The canoe, as recited in claim 3, wherein said sliding attachment means is an adjustable bracket capable of sliding inside boltrope slot and selectively locked in a fixed locations, said adjustable bracket includes flat body with a recessed guide surface formed thereon that fits inside said boltrope slot when said bracket is longitudinally and perpendicularly aligned with said slot, a strap opening and a nut slot formed on said body, a bolt perpendicularly aligned on said body, said bolt includes a threaded shaft and a flanged head that is positioned adjacent to guide surface, a threaded nut disposed inside said nut slot formed on said body and attached to said threaded shaft, whereby when recessed guide surface is inserted into said boltrope slot on said gunwale, and said nut is tightened, said flange head is forces against the insides surface of said boltrope slot thereby securely attaching said bracket in a lock position on said gunwale.

5. The canoe, as recited in claim 1, further including at least one adjustable seat located inside said hull, said seat being attached to said gunwales
   on opposite sidewalls by a sliding seat attachment means including an elongated rod longitudinally aligned inside each said boltrope slot in said gunwale, each said elongated rod including an inward extending, fixed front strap bracket that attaches to one said adjustable strap attached to said seat assembly and an inward extending rear brace bracket that attaches to an end on said brace.

6. The canoe, as recited in claim 1, further including a thwart disposed transversely inside said hull, said thwart including two opposite ends that attach to said slots on said gunwales on opposite said sidewalls.

7. The canoe, as recited in claim 6, wherein said thwart is adjustable in length.

* * * * *